US009480915B2

(12) United States Patent
Takahashi et al.

(10) Patent No.: US 9,480,915 B2
(45) Date of Patent: Nov. 1, 2016

(54) GAME SYSTEM, SERVER SYSTEM, PROCESSING METHOD, AND INFORMATION STORAGE MEDIUM

(71) Applicant: NAMCO BANDAI Games Inc., Shinagawa-ku, Tokyo (JP)

(72) Inventors: Tsuyoshi Takahashi, Tokyo (JP); Jun Tamaoki, Tokyo (JP); Makoto Yonezawa, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 412 days.

(21) Appl. No.: 14/226,920

(22) Filed: Mar. 27, 2014

(65) Prior Publication Data

US 2014/0295941 A1    Oct. 2, 2014

(30) Foreign Application Priority Data

Mar. 29, 2013 (JP) ................................. 2013-075248

(51) Int. Cl.
| A63F 13/00 | (2014.01) |
| A63F 13/358 | (2014.01) |
| A63F 13/792 | (2014.01) |
| A63F 13/493 | (2014.01) |
| A63F 13/803 | (2014.01) |

(52) U.S. Cl.
CPC ........... *A63F 13/358* (2014.09); *A63F 13/493* (2014.09); *A63F 13/792* (2014.09); *A63F 13/803* (2014.09)

(58) Field of Classification Search
CPC ........ A63F 13/00; A63F 13/45; A63F 13/47; A63F 13/493; A63F 13/497; A63F 13/55
USPC ...................................................... 463/7, 24
See application file for complete search history.

(56) References Cited

U.S. PATENT DOCUMENTS

| 6,336,861 | B1 * | 1/2002 | Konoe ................... A63F 13/10 463/23 |
| 8,096,882 | B2 * | 1/2012 | Jung ....................... G06Q 30/06 273/461 |
| 8,425,329 | B2 | 4/2013 | Fujisawa et al. |
| 8,662,975 | B1 * | 3/2014 | Wieczorek .............. A63F 13/12 463/9 |
| 2008/0070689 | A1 * | 3/2008 | Van Luchene .......... G07F 17/32 463/42 |
| 2009/0053970 | A1 * | 2/2009 | Borge ..................... A63F 13/02 446/268 |
| 2009/0100353 | A1 * | 4/2009 | Cradick .................. A63F 13/12 715/757 |
| 2009/0280908 | A1 * | 11/2009 | Carroll .................... A63F 13/10 463/42 |
| 2012/0108344 | A1 * | 5/2012 | Fujisawa ................. A63F 13/12 463/42 |
| 2012/0270644 | A1 * | 10/2012 | Buhr ....................... A63F 13/12 463/29 |
| 2013/0217490 | A1 | 8/2013 | Fujisawa et al. |

FOREIGN PATENT DOCUMENTS

| JP | 2000-024317 A | 1/2000 |
| JP | 2012-090844 A | 5/2012 |

\* cited by examiner

*Primary Examiner* — Michael Cuff
(74) *Attorney, Agent, or Firm* — Posz Law Group, PLC

(57) ABSTRACT

A game system includes a game processing section that performs a process that implements a game that utilizes a moving object, the moving object moving in a game space based on operation information, a restoration processing section that performs a restoration process that restores the moving object that has reached an unable-to-continue state when it has become unable to continue to play the game that utilizes the moving object, the moving object being restored at a restoration point in the game space that has been selected by a player, and a charging section. The charging section performs a charging process that causes a charge to differ corresponding to the restoration point selected by the player.

9 Claims, 19 Drawing Sheets

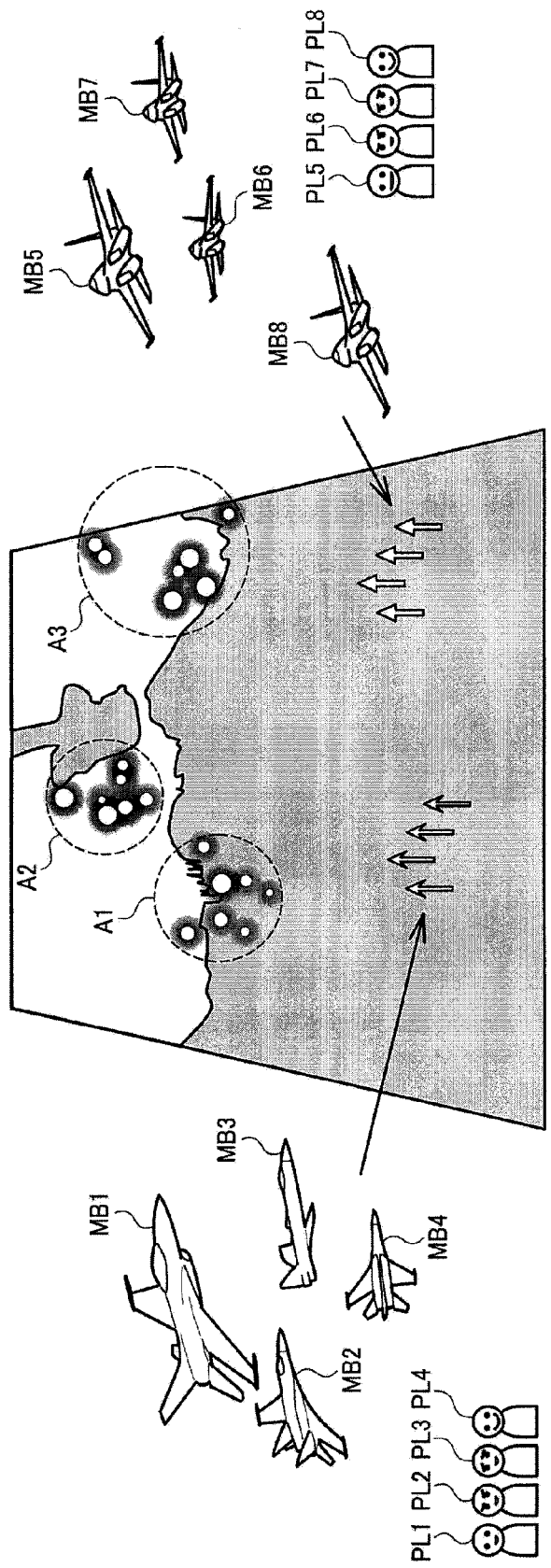

| RESTORATION POINT | CHARGE |
|---|---|
| P1 | 0 |
| P2 | 40 |
| P3 | 100 |
| P4 | 200 |
| P5 | 300 |
| P6 | 500 |

0 SECONDS HAS ELAPSED

MB
MOVES INSTANTLY
TO DEAD POINT DP
AT RATE OF 300

TR

DP

5 SECONDS HAS ELAPSED

MB
MOVES INSTANTLY
TO DEAD POINT DP
AT RATE OF 200

TR

DP

10 SECONDS HAS ELAPSED

MB
MOVES INSTANTLY
TO DEAD POINT DP
AT RATE OF 100

TR

DP

15 SECONDS HAS ELAPSED

MB

TR

DP

FIGHTER AIRCRAFT HAS BEEN SHOT DOWN (UNABLE-TO-CONTINUE STATE)

RESTORATION

FIG. 10A
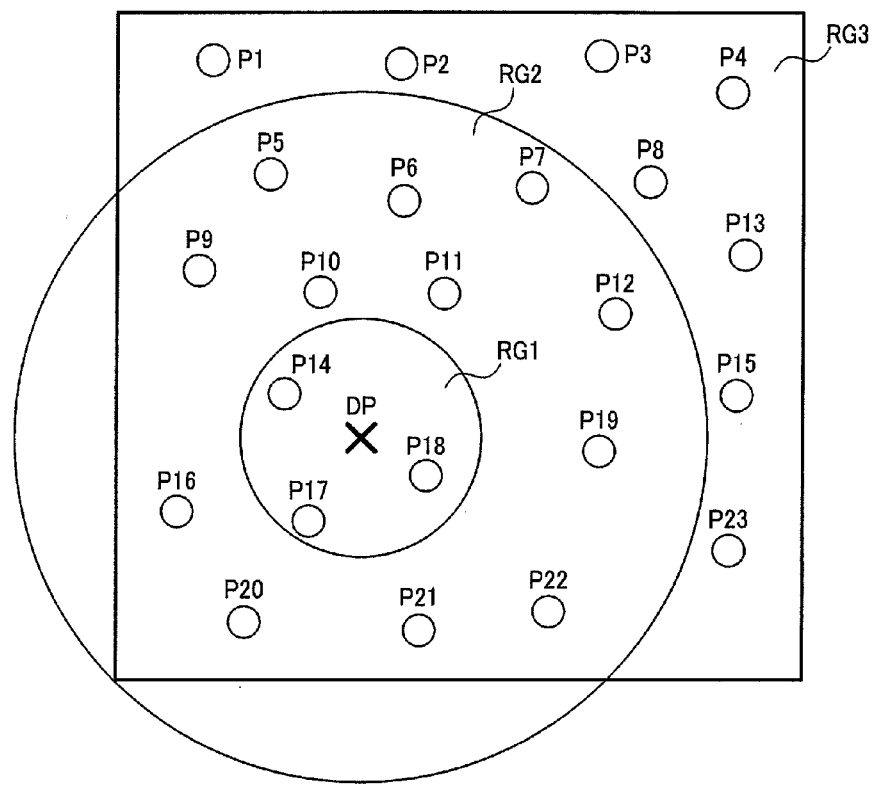
FIG. 10B
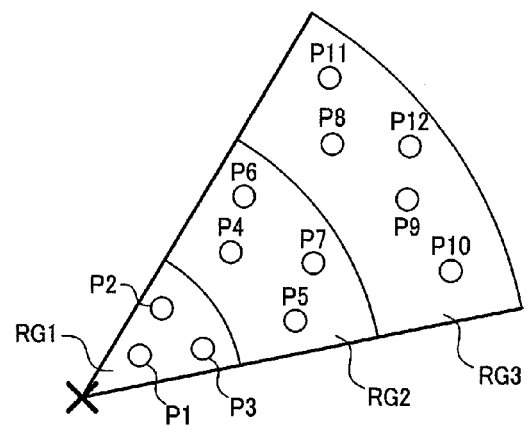
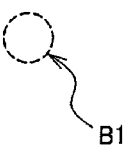

FIG. 11A

| RESTORATION POINT | POSITION | DIRECTION WHEN RESTORED |
|---|---|---|
| P1 | X1, Y1, Z1 | DR1 |
| P2 | X2, Y2, Z2 | DR2 |
| P3 | X3, Y3, Z3 | DR3 |
| P4 | X4, Y4, Z4 | DR4 |
| ⋮ | ⋮ | ⋮ |

FIG. 11B

| DISTANCE RANGE | CHARGE |
|---|---|
| RG1 | 500 |
| RG2 | 300 |
| RG3 | 100 |
| ⋮ | ⋮ |

FIG. 12

| FIGHTER AIRCRAFT RANK | CHARGE=0 | CHARGE=100 | CHARGE=200 |
|---|---|---|---|
| RANK A | CAN BE RESTORED AT ONLY RESTORATION POINT WITHIN DISTANCE RANGE RG3 | CAN BE RESTORED AT RESTORATION POINT WITHIN DISTANCE RANGE RG2 OR RG3 | CAN BE RESTORED AT RESTORATION POINT WITHIN DISTANCE RANGE RG1, RG2, OR RG3 |
| RANK B | CAN BE RESTORED AT RESTORATION POINT WITHIN DISTANCE RANGE RG2 OR RG3 | CAN BE RESTORED AT RESTORATION POINT WITHIN DISTANCE RANGE RG1, RG2, OR RG3 | |
| RANK C | CAN BE RESTORED AT RESTORATION POINT WITHIN DISTANCE RANGE RG1, RG2, OR RG3 | | |

FIG. 14

| CHARGE=0 | NOT CHANGE |
|---|---|
| CHARGE=100 | SPEED IS INCREASED FOR 30 SECONDS AFTER RESTORATION |
| CHARGE=200 | SPEED IS INCREASED FOR 30 SECONDS AFTER RESTORATION<br>WEAPON RELOAD SPEED IS INCREASED FOR 60 SECONDS AFTER RESTORATION |
| CHARGE=500 | SPEED IS INCREASED, AND FIGHTER AIRCRAFT BECOMES INVINCIBLE FOR 30 SECONDS AFTER RESTORATION<br>WEAPON RELOAD SPEED IS INCREASED FOR 60 SECONDS AFTER RESTORATION<br>DAMAGE APPLIED BY ENEMY IS REDUCED BY 50% FOR 90 SECONDS AFTER RESTORATION |

FIG. 15A

| CHARGE=0 | RECOVERY RATE AFTER RESTORATION IS LOW |
|---|---|
| CHARGE=100 | RECOVERY RATE AFTER RESTORATION IS HIGH |
| CHARGE=200 | GAME PARAMETER IS RECOVERED TO 100% IMMEDIATELY AFTER RESTORATION |
| CHARGE=500 | GAME PARAMETER IS RECOVERED TO 120% IMMEDIATELY AFTER RESTORATION |

FIG. 15B

| CHARGE=0 | WAIT TIME UNTIL RESTORABLE STATE OCCURS IS LONG |
|---|---|
| CHARGE=200 | WAIT TIME UNTIL RESTORABLE STATE OCCURS IS SHORT (COUNTDOWN SPEED IS INCREASED) |
| CHARGE=500 | WAIT TIME UNTIL RESTORABLE STATE OCCURS=0 |

FIG. 15C

| CHARGE=0 | MAXIMUM RESTORATION COUNT=3 |
|---|---|
| CHARGE=200 | MAXIMUM RESTORATION COUNT=4 |
| CHARGE=500 | MAXIMUM RESTORATION COUNT=8 |

FIG. 16A

| CHARGE=0 | NO ADDITIONAL ACTION |
|---|---|
| CHARGE=100 | MAKE SORTIE AGAIN AFTER APPLYING DAMAGE TO ENEMY THAT WAS AIMING AT FIGHTER AIRCRAFT WHEN FIGHTER AIRCRAFT WAS SHOT DOWN |
| CHARGE=200 | MAKE SORTIE AGAIN AFTER DEFEATING ENEMY THAT WAS AIMING AT FIGHTER AIRCRAFT WHEN FIGHTER AIRCRAFT WAS SHOT DOWN |
| CHARGE=500 | MAKE SORTIE AGAIN AFTER APPLYING DAMAGE TO ALL ENEMIES ON MAP |

FIG. 16B

| NO CHARGE | CANNOT CHANGE WEAPON, SKILL, OR THE LIKE AFTER RESTORATION |
|---|---|
| CHARGED | CAN CHANGE WEAPON, SKILL, OR THE LIKE AFTER RESTORATION |

GAME SYSTEM, SERVER SYSTEM, PROCESSING METHOD, AND INFORMATION STORAGE MEDIUM

Japanese Patent Application No. 2013-075248 filed on Mar. 29, 2013, is hereby incorporated by reference in its entirety.

BACKGROUND

The present invention relates to a game system, a server system, a processing method, an information storage medium, and the like.

A fighter aircraft game has been known that is designed so that the player causes a moving object that imitates a fighter aircraft to fly in an object space, and attack an enemy to compete for a score, for example.

Such a fighter aircraft game may be designed to implement a restoration process that causes a fighter aircraft that has been shot down to be restored at a given restoration point, and make a sortie again. For example, JP-A-2000-24317 and JP-A-2012-90844 discloses a technique relating to such a restoration process.

In recent years, a game system has attracted attention that connects a server system and a terminal device through a network, and allows the player to enjoy a game that utilizes a network (hereinafter appropriately referred to as "network game"). It is important for such a game system to implement a charging process that charges the player corresponding to the value desired by the player.

However, JP-A-2000-24317 and JP-A-2012-90844 do not take account of combining the restoration process with the charging process or the like.

SUMMARY

According to one aspect of the invention, there is provided a game system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a restoration point in the game space that has been selected by a player; and a charging section that performs a charging process, the charging section performing the charging process that causes a charge to differ corresponding to the restoration point selected by the player.

According to another aspect of the invention, there is provided a game system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a given restoration point; and a charging section that performs a charging process, the restoration processing section performing a process that changes a game condition when the moving object is restored corresponding to a charge determined by the charging process.

According to another aspect of the invention, there is provided a game system comprising:

a game processing section that performs a process that implements a game that utilizes a moving object, the moving object moving in a game space based on operation information; and a restoration processing section that performs a restoration process that restores the moving object that has reached an unable-to-continue state when it has become unable to continue to play the game that utilizes the moving object, the moving object being restored at a restoration point in the game space that has been selected by a player, the restoration processing section changing a game condition when the moving object is restored corresponding to the restoration point selected by the player.

According to another aspect of the invention, there is provided a server system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a restoration point in the game space that has been selected by a player; and a charging section that performs a charging process, the charging section performing the charging process that causes a charge to differ corresponding to the restoration point that has been selected by the player.

According to another aspect of the invention, there is provided a processing method comprising:

performing a process that implements a game that utilizes a moving object, the moving object moving in a game space based on operation information;

performing a restoration process that restores the moving object that has reached an unable-to-continue state when it has become unable to continue to play the game that utilizes the moving object, the moving object being restored at a restoration point in the game space that has been selected by a player; and performing a charging process that causes a charge to differ corresponding to the restoration point selected by the player.

According to another aspect of the invention, there is provided a processing method comprising:

performing a process that implements a game that utilizes a moving object, the moving object moving in a game space based on operation information;

performing a restoration process that restores the moving object that has reached an unable-to-continue state when it has become unable to continue to play the game that utilizes the moving object, the moving object being restored at a given restoration point; and performing a charging process, the performing of the restoration process including performing a process that changes a game condition when the moving object is restored corresponding to a charge determined by the charging process.

According to another aspect of the invention, there is provided a processing method comprising:

performing a process that implements a game that utilizes a moving object, the moving object moving in a game space based on operation information; and performing a restoration process that restores the moving object that has reached an unable-to-continue state when it has become unable to continue to play the game that utilizes the moving object, the moving object being restored at a restoration point in the game space that has been selected by a player, the performing of the restoration process including changing a game condition when the moving object is restored corresponding to the restoration point selected by the player.

According to another aspect of the invention, there is provided a computer-readable information storage medium storing a program that causes a computer to execute the above processing method.

BRIEF DESCRIPTION OF THE DRAWINGS

FIG. 4 is a view illustrating a team battle mode.

FIGS. 10A and 10B are views illustrating a restoration point setting method using a distance range.

FIGS. 11A and 11B are views illustrating an example of restoration point information and charging information.

FIG. 12 is a view illustrating a method that performs a charging process corresponding to fighter aircraft rank.

FIG. 14 is a view illustrating a method that changes a game condition when a moving object is restored corresponding to the charge.

FIGS. 15A to 15C are views illustrating a method that changes a game condition when a moving object is restored corresponding to a charge.

FIGS. 16A and 16B are views illustrating a method that changes a game condition when a moving object is restored corresponding to a charge.

DESCRIPTION OF EXEMPLARY EMBODIMENTS

Figure 1A:
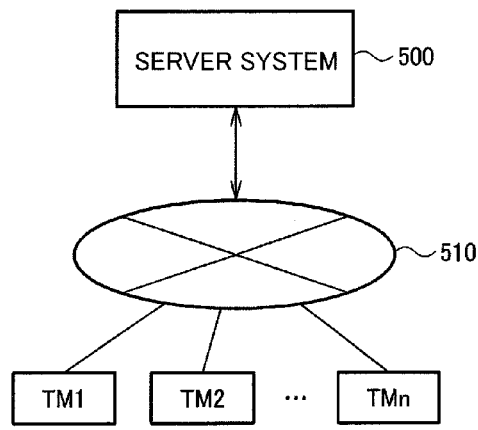
FIGS. 1A to 1E are views illustrating a configuration example of a game system according to one embodiment of the invention.
Figure 1B:
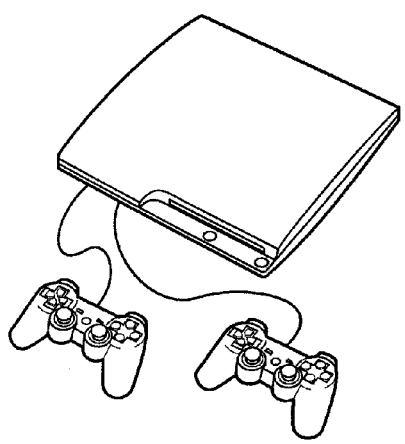
Figure 1C:
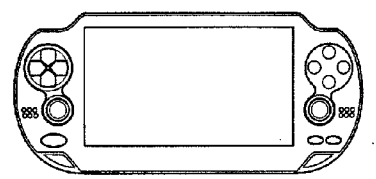
Figure 1D:
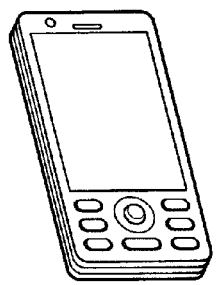
Figure 1E:
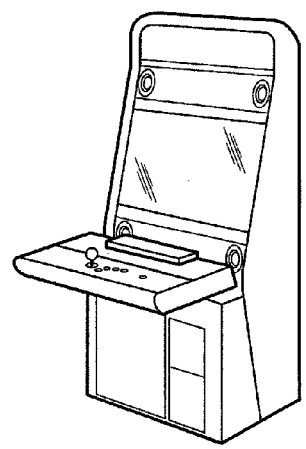

Several aspects of the invention may provide a game system, a server system, a processing method, an information storage medium, and the like that can implement a process that combines a restoration process with a charging process or the like.

According to one embodiment of the invention, there is provided a game system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a restoration point in the game space that has been selected by a player; and a charging section that performs a charging process, the charging section performing the charging process that causes a charge to differ corresponding to the restoration point selected by the player.

According to the above configuration, the restoration process is performed that restores the moving object at the restoration point selected by the player when it has become unable to continue to play the game that utilizes the moving object that moves in the game space. In this case, the charging process is performed that causes the charge to differ corresponding to the restoration point selected by the player. This makes it possible to implement a process that combines the restoration process with the charging process or the like, and provide a novel game system.

In the game system, the charging section may perform the charging process that increases the charge as a distance from an unable-to-continue point to the restoration point selected by the player decreases, the unable-to-continue point being a point at which the moving object has reached the unable-to-continue state.

The above configuration allows the player to select whether to accept to be charged to avoid a time loss or the like, or allow a time loss or the like without accepting to be charged.

In the game system, the restoration processing section may calculate a predicted moving point of the moving object when assuming that the moving object has not reached the unable-to-continue state, and the charging section may perform the charging process that increases the charge when the player has selected the predicted moving point as the restoration point as compared with a case where the player has selected another point as the restoration point.

According to the above configuration, a time lag period until the restoration process is performed after the moving object has reached the unable-to-continue state can be canceled by accepting to be charged, for example.

In the game system, the charging section may perform the charging process that decreases the charge, and the restoration processing section may perform a process that sets a game condition when the moving object is restored to be an advantageous condition, when a distance from an unable-to-continue point to the restoration point selected by the player is long, the unable-to-continue point being a point at which the moving object has reached the unable-to-continue state, and the charging section may perform the charging process that increases the charge, and the restoration processing section may perform a process that sets the game condition when the moving object is restored to be a disadvantageous condition, when the distance from the unable-to-continue point to the restoration point is short.

The above configuration makes it possible to maintain the balance between the advantage setting that utilizes the charge and the advantage setting that utilizes the game condition, and improve the game balance and the like.

In the game system, the restoration processing section may perform a process that presents a plurality of candidate restoration points to the player, the plurality of candidate restoration points being set along a moving path of the moving object up to an unable-to-continue point at which the moving object has reached the unable-to-continue state, or set to a plurality of distance ranges that differ in distance from the unable-to-continue point.

The above configuration makes it possible for the player to select the restoration point while checking the candidate restoration points that are set along the moving path of the moving object, or set to a plurality of distance ranges. Therefore, the interface environment for the player can be improved.

In the game system, the restoration processing section may perform a process that changes at least one game condition corresponding to the charge determined by the charging process, the at least one game condition being at least one condition among a game parameter setting condition when the moving object is restored, a condition relating to a wait time until the moving object is set to a restorable state from the unable-to-continue state, a condition relating to a maximum restoration count of the moving object, a condition relating to an effect of the moving object on a game parameter of another moving object when the moving object is restored, and an equipment change condition when the moving object is restored.

The above configuration makes it possible to implement a process that combines the charging process with the process that sets the game condition (e.g., the game parameter when the moving object is restored, the wait time until the moving object is set to the restorable state, the maximum restoration count, the effect of the moving object on another moving object when the moving object is restored, and a change in equipment), and provide a novel game system.

According to another embodiment of the invention, there is provided a game system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a given restoration point; and a charging section that performs a charging process, the restoration processing section performing a process that changes a game condition when the moving object is restored corresponding to a charge determined by the charging process.

According to the above configuration, the restoration process is performed that restores the moving object at the restoration point selected by the player when it has become unable to continue to play the game that utilizes the moving object that moves in the game space. In this case, the process is performed that changes the game condition when the moving object is restored corresponding to the charge determined by the charging process. This makes it possible to implement a process that combines the restoration process with the charging process or the like, and provide a novel game system.

In the game system, the restoration processing section may perform a process that changes at least one game condition corresponding to the charge determined by the charging process, the at least one game condition being at least one condition among a game parameter setting condition when the moving object is restored, a condition relating to a wait time until the moving object is set to a restorable state from the unable-to-continue state, a condition relating to a maximum restoration count of the moving object, a condition relating to an effect of the moving object on a game parameter of another moving object when the moving object is restored, and an equipment change condition when the moving object is restored.

According to another embodiment of the invention, there is provided a game system comprising:

a game processing section that performs a process that implements a game that utilizes a moving object, the moving object moving in a game space based on operation information; and a restoration processing section that performs a restoration process that restores the moving object that has reached an unable-to-continue state when it has become unable to continue to play the game that utilizes the moving object, the moving object being restored at a restoration point in the game space that has been selected by a player, the restoration processing section changing a game condition when the moving object is restored corresponding to the restoration point selected by the player.

According to the above configuration, the restoration process is performed that restores the moving object at the restoration point selected by the player when it has become unable to continue to play the game that utilizes the moving object that moves in the game space. In this case, the process is performed that changes the game condition when the moving object is restored corresponding to the restoration point selected by the player. This makes it possible to implement a process that combines the restoration process with the process that sets the game condition when the moving object is restored, or the like, and provide a novel game system.

According to another embodiment of the invention, there is provided a server system comprising:

a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a restoration point in the game space that has been selected by a player; and a charging section that performs a charging process, the charging section performing the charging process that causes a charge to differ corresponding to the restoration point that has been selected by the player.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Game System

A configuration example of a game system according to one embodiment of the invention is described below with reference to FIGS. 1A to 1E.

In FIG. 1A, a server system 500 (information processing system) is connected to terminal devices TM1 to TMn through a network 510. For example, the server system 500 is a host, and the terminal devices TM1 to TMn are clients. Although an example in which the game system according to one embodiment of the invention and the process performed by the game system are mainly implemented by the server system 500 is described below, the entirety or part of the game system and the process performed by the game system may be implemented by the terminal devices TM1 to TMn.

The server system 500 may be implemented by one or a plurality of servers (e.g., management server, game server, charging server, service providing server, content distribution server, authentication server, database server, or communication server), for example. The server system 500 provides various services for a community-type website and an online game. The server system 500 manages data necessary for implementing (executing) the game, and distributes a client program, various types of data, and the like.

The network 510 (distribution network or communication line) is a communication channel that utilizes the Internet, a wireless LAN, and the like. The network 510 may include a communication network such as a LAN that utilizes a private line (private cable) for direct connection, Ethernet (registered trademark), and the like, a telecommunication network, a cable network, and a wireless LAN. The communication method may be a cable communication method or a wireless communication method.

The terminal devices TM1 to TMn (player terminals) are terminals having a network connection function (Internet connection function), for example. The terminal devices TM1 to TMn may be a consumer game device (stationary game device) (see FIG. 1B), a portable game device (see FIG. 1C), a portable communication terminal (smartphone, futurephone, or mobile phone) (see FIG. 1D), an arcade game device (see FIG. 1E), or the like. An information processing device such as a personal computer (PC) or a tablet computer may also be used as the terminal devices TM1 to TMn.

Figure 2:
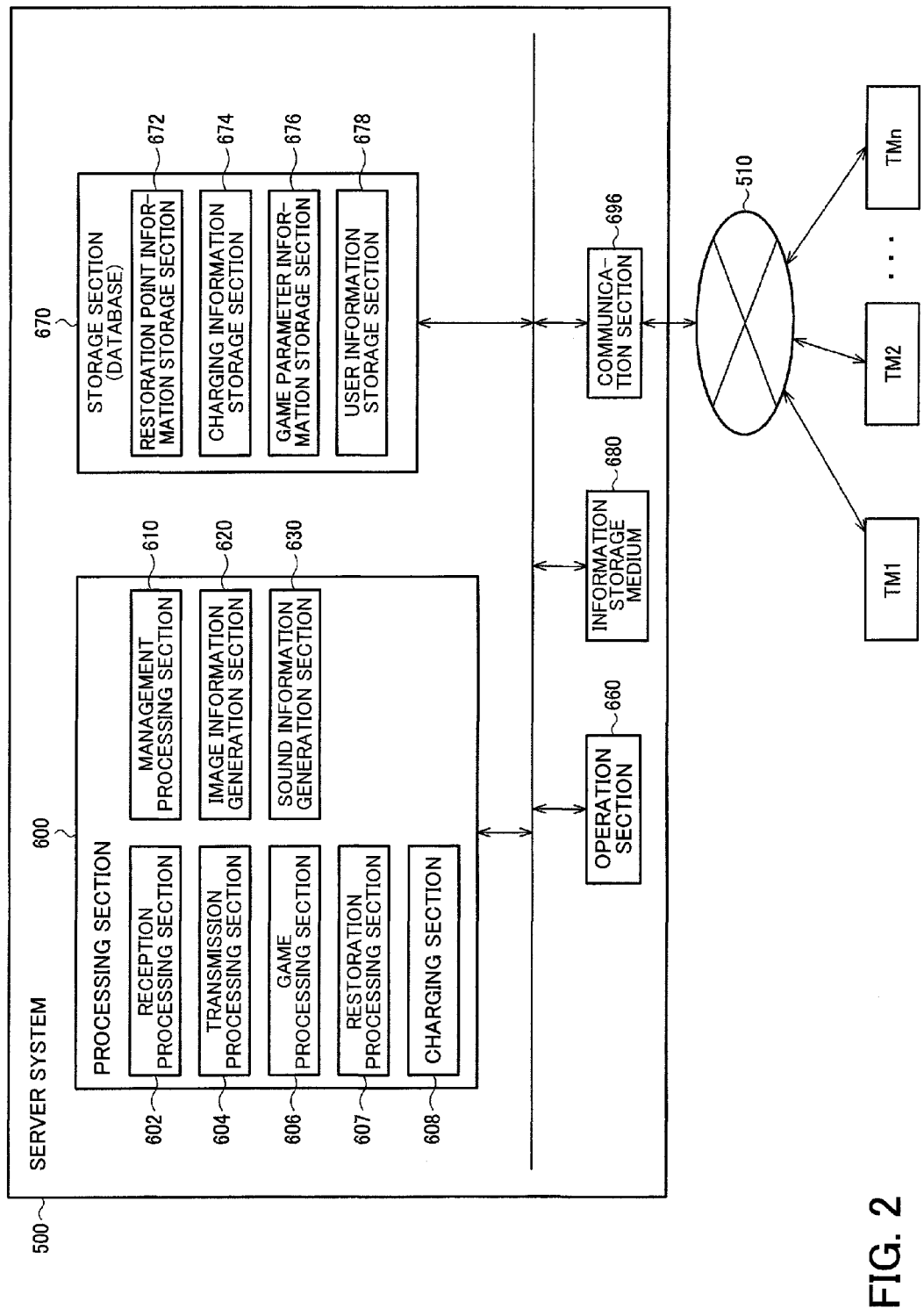
FIG. 2 illustrates a configuration example of a server system according to one embodiment of the invention.

FIG. 2 illustrates a configuration example of the server system 500 (game system, host device, or information processing system) according to one embodiment of the invention. Note that the configuration of the server system 500 is not limited to the configuration illustrated in FIG. 2. Various modifications may be made, such as omitting some of the elements (sections), or adding other elements.

The server system 500 includes a processing section 600, an operation section 660, a storage section 670, and a communication section 696.

The processing section 600 performs various processes necessary for implementing various types of service/management provided by the server based on data received through the communication section 696, data stored in the storage section 670, a program, and the like. The function of the processing section 600 may be implemented by hardware such as a processor (e.g., CPU or GPU) or an ASIC (e.g., gate array), or a program.

The processing section 600 includes a reception processing section 602, a transmission processing section 604, a game processing section 606, a restoration processing section 607, a charging section 608, a management processing section 610, an image information generation section 620, and a sound information generation section 630.

The reception processing section 602 performs a reception process that receives information from the terminal device or the like. The transmission processing section 604 performs a transmission process that transmits information to the terminal device or the like. The reception process includes a process that instructs the communication section 696 to receive information, a process that acquires information received by the communication section 696, and writes the acquired information into the storage section 670, and the like. The transmission process includes a process that instructs the communication section 696 to transmit information, a process that indicates the transmission target information to the communication section 696, and the like.

The game processing section 606 performs a game process. Examples of the game process include a process that starts the game when a game start condition has been satisfied, a process that proceeds with the game, a process that terminates the game when a game end condition has been satisfied, a process that calculates the game result, and the like. For example, the game processing section 606 starts the game, proceeds with the game, or terminates the game based on operation information input by the player (user) using the terminal device. The game processing section 606 may perform a game process that causes an object (e.g., moving object) to move or make a motion based on the operation information input by the player. The game processing section 606 performs a process for generating image information or sound information (game information). Specifically, the game processing section 606 performs a game process for displaying a game screen or the like on the terminal device, or a game process for causing the terminal device to output a game sound.

The restoration processing section 607 performs a restoration process that restores a moving object (player) that has reached an unable-to-continue state at a restoration point. The charging section 608 performs a charging process (e.g., charging determination process, charging data generation process, and storage process). The details of the restoration process and the charging process are described later.

The management processing section 610 performs a server management process. For example, the management processing section 610 performs a management process that manages various services provided by the server, and a management process that manages information such as server management information.

The player acquires an account by performing given procedures when the user desires to use the service provided by the server system 500. When the user has logged in by inputting a password linked to the acquired account, the player can use various services (e.g., network game service, online shopping service (e.g., item shopping service), message exchange service, and friend user registration service). The management processing section 610 also performs a management process that manages account information about the player.

The image information generation section 620 generates image information for generating an image. The sound information generation section 630 generates sound information for generating sound (sound, game sound, or effect sound). The image information is information for the terminal devices TM1 to TMn to generate and display an image generated by the method according to one embodiment of the invention. The image information may be image data, or may be data (e.g., display screen setting data or object data) for each terminal device to generate and display an image.

This also applies to the sound information generated by the sound information generation section 630.

The operation section 660 allows the system administrator (operator) to input information.

The storage section 670 serves as a work area for the processing section 600, the communication section 696, and the like. The function of the storage section 670 may be implemented by a RAM (DRAM, SRAM, or VRAM), a solid state drive (SSD), a hard disk drive (HDD), or the like.

The storage section 670 includes a restoration point information storage section 672, a charging information storage section 674, a game parameter information storage section 676, and a user information storage section 678. The restoration point information storage section 672 stores information about the restoration point used by the restoration processing section 607. The charging information storage section 674 stores information about the charging process performed by the charging section 608. The game parameter information storage section 676 stores information about a game parameter used for the game process performed by the game processing section 606. The user information storage section 678 stores personal information (e.g., name, sex, date of birth, and e-mail address) about the player as user information. For example, the account information about the player is also stored as the user information. The charging information stored in the charging information storage section 674 is linked to the account information about each player.

An information storage medium 680 (computer-readable medium) stores a program, data, and the like. The function of the information storage medium 680 may be implemented by an HDD, a memory (e.g., ROM), an optical disk (CD or DVD), or the like. A program that causes a computer (i.e., a device that includes an operation section, a processing section, a storage section, and an output section) to function as each section of the game system (e.g., server system) according to one embodiment of the invention (i.e., a program that causes a computer to execute the process of each section) is stored in the information storage medium 680.

Note that the process according to one embodiment of the invention may be implemented by causing the terminal device to execute the game program, or may be implemented by executing a web browser program or script control. For example, the process according to one embodiment of the invention may be implemented as a browser game that acquires information necessary for the game through a communication line (e.g., Internet), and implements interactive display on a browser.

The communication section 696 communicates with the terminal devices TM1 to TMn or another external server through the cable/wireless network 510. The function of the communication section 696 may be implemented by hardware (e.g., communication ASIC or communication processor), or communication firmware.

Figure 3:
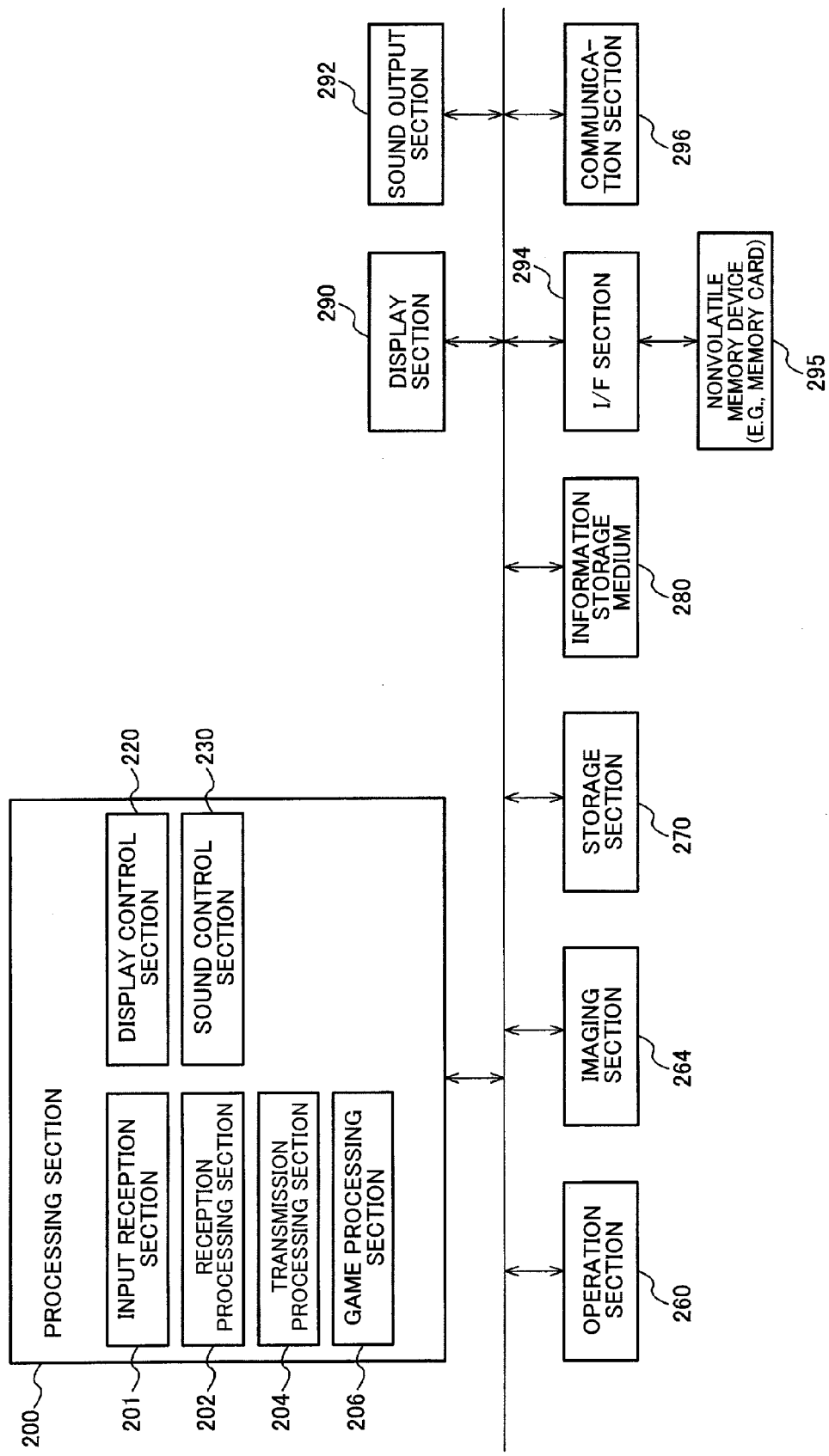
FIG. 3 illustrates a configuration example of a terminal device according to one embodiment of the invention.

FIG. 3 illustrates a configuration example of the terminal device (player terminal or client device) according to one embodiment of the invention. Note that the configuration of the terminal device is not limited to the configuration illustrated in FIG. 3. Various modifications may be made, such as omitting some of the elements (sections), or adding other elements.

The terminal device includes a processing section 200, an operation section 260, an imaging section 264, a storage section 270, a display section 290, a sound output section 292, an I/F section 294, and a communication section 296.

The processing section 200 (processor) performs a process for providing a service, a game process, an image display process, a sound output process, and the like based on operation information from the operation section 260, a program, and the like. The processing section 200 performs various processes using the storage section 270 as a work area. The function of the processing section 200 may be implemented by hardware such as a processor (e.g., CPU or GPU) or an ASIC (e.g., gate array), or a program.

The processing section 200 includes an input reception processing section 201, a reception processing section 202, a transmission processing section 204, a game processing section 206, a display control section 120, and a sound control section 130.

The input reception processing section 201 performs a reception process that receives information input by the user (player). For example, the input reception processing section 201 receives information input through the operation section 260. The reception processing section 202 performs a reception process that receives information from an external device (e.g., server system or another terminal device). The transmission processing section 204 performs a transmission process that transmits information to an external device (e.g., server system or another terminal device). The game processing section 206 performs a game process. The display control section 220 performs a control process for displaying an image on the display section 290. For example, when the terminal device generates an image, the display control section 220 performs a drawing process based on the results of various processes (application process and game process) performed by the processing section 200 to generate an image, and outputs the generated image to the display section 290. When the server system generates an image, the display control section 220 performs a control process that displays an image based on the image information from the server system on the display section 290. The sound control section 230 performs a sound control process based on the results of various processes performed by the processing section 200. The sound control section 230 thus causes the sound output section 292 to output a background music (BGM), an effect sound, voice, and the like.

The operation section 260 allows the user (player) to input the operation information and the like. The function of the operation section 260 may be implemented by a direction key, an operation button, an analog stick, a lever, a sensor (e.g., angular velocity sensor or acceleration sensor), a microphone, a touch panel display, or the like.

The imaging section 264 (camera) captures an object. The imaging section 264 may be implemented by an image sensor (e.g., CCD or CMOS sensor), an optical system (e.g., focus lens), and the like.

The storage section 270 serves as a work area for the processing section 200, the communication section 296, and the like. The function of the storage section 270 may be implemented by a RAM, an SSD, an HDD, or the like.

An information storage medium 280 (computer-readable medium) stores a program, data, and the like. The function of the information storage medium 280 may be implemented by an optical disk, an HDD, a memory, or the like. The processing section 200 performs various processes according to one embodiment of the invention based on a program (data) stored in the information storage medium 280.

The display section 290 outputs (displays) an image generated according to one embodiment of the invention. The function of the display section 290 may be implemented by an LCD, an organic EL display, a CRT, an HMD, or the like. The sound output section 292 outputs sound generated according to one embodiment of the invention. The function of the sound output section 292 may be implemented by a speaker, a headphone, or the like.

The I/F (interface) section 294 performs an interface process with a nonvolatile memory device 295 (portable information storage medium). The I/F section 294 may be implemented by an I/F processing ASIC or the like. The nonvolatile memory device 295 allows the user to store information. The nonvolatile memory device 295 holds the information even when power is not supplied. The nonvolatile memory device 295 may be implemented by an IC card (memory card), a USB memory, a magnetic card, or the like.

The communication section 296 communicates with an external device (e.g., server system or another terminal device) through the network 510. The function of the communication section 296 may be implemented by hardware (e.g., communication ASIC or communication processor), or communication firmware.

As illustrated in FIG. 2, the server system 500 (game system) includes the game processing section 606, the restoration processing section 607, and the charging section 608.

The game processing section 606 performs a process that implements a game that utilizes a moving object that moves in a game space based on the operation information (operation information input by the player). The moving object is an object that imitates an airplane (fighter aircraft), a car, a robot, a ship, a human, or the like. For example, when implementing a three-dimensional game, the moving object (object) is disposed in an object space (i.e., game space), and the movement and the motion of the moving object are controlled based on the operation information input by the player, and a given algorithm executed by a computer. Note that the moving object may be a two-dimensional object in a two-dimensional game.

More specifically, an object (i.e., an object formed by a primitive surface such as a polygon, a free-form surface, or a subdivision surface) that represents a display object such as a moving object (character), a map (topography), a building, a track (course) (road), a tree, or a wall is disposed in the object space. Specifically, the position and the rotation angle (synonymous with orientation or direction) of the object in a world coordinate system are determined, and the object is disposed at the determined position (X, Y, Z) and the determined rotation angle (rotation angles around X, Y, and Z axes). The moving object that moves (make a motion) in the object space is controlled. For example, the moving object is moved in the object space based on the operation information input by the player, a program (movement algorithm), various types of data (motion data), and the like. Specifically, a simulation process is performed that sequentially calculates movement information (position, rotation angle, speed, or acceleration) about the moving object every frame (e.g., 1/60th of a second). Note that the term "frame" refers to a time unit used when performing the movement process, the motion process, or the image generation process.

The game processing section 206 of the terminal device may perform a control process (simulation process) that causes the moving object to move or make a motion in the object space. In this case, the game processing section 606 of the server system performs the process that proceeds with the game that utilizes the moving object, the management process, and the like as the game process. The game processing section 606 also performs various processes (e.g., synchronization process and communication process) necessary for the network game.

The restoration processing section 607 performs the restoration process that restores the moving object that has reached the unable-to-continue state when it has become unable to continue to play the game that utilizes the moving object. For example, the restoration processing section 607 performs the restoration process that restores the moving object at the restoration point in the game space that has been selected by the player.

The term "unable-to-continue state" used herein refers to a state in which the durability points, the hit points, or the like of the moving object have become 0 (minimum value) due to an attack or the like, and the moving object cannot continue to participate in the game (i.e., the player is unable to continue to play the game). For example, when the game is a fighter aircraft game, the term "unable-to-continue state" refers to a state in which the fighter aircraft has been shot down by the enemy, and the durability points of the fighter aircraft have become 0. When the game is an RPG game or an action game, the term "unable-to-continue state" refers to a state in which the character has been attacked, and the hit points of the character have become 0 (i.e., the character has become unable to engage in a battle).

The restoration process is a process recovers the durability points, the hit points, or the like of the moving object, and causes the moving object to transition from the unable-to-continue state to an able-to-play state. When the restoration process is performed so that the state in the game space other than the state of the moving object is maintained. For example, the restoration process (recovery process) that restores the moving object that has reached the unable-to-continue state is performed so that the state of another moving object and the state of the enemy are maintained. The restoration process differs from a process (e.g., continuance process) resets the entire state in the game space, and starts the game again.

In one embodiment of the invention, the charging section 608 performs the charging process that causes the charge (amount or points changed) to differ corresponding to the restoration point selected by the player. For example, the charging section 608 performs the charging process that causes the charge to differ corresponding to a restoration point among a plurality of restoration points that has been selected by the player. Alternatively, the charging section 608 may perform the charging process that causes the charge to differ corresponding to the way in which the restoration point has been selected by the player.

The charge used during the charging process may be based on a real currency, or may be based on a virtual currency (pseudo-currency) that can be used in the game or another service. The charge need not be presented to the player as a charge based on a real currency. For example, the charge may be presented to the player as points charged, and the points charged may be converted into a real currency or a virtual currency. When the player who operates the moving object has been charged, the charging information about the player is stored in the charging information storage section 674 while being linked to the account information about the player that is stored in the user information storage section 678 (see FIG. 2).

The charging section 608 performs the charging process that increases the charge (amount or points charged) as the distance from an unable-to-continue point (dead point) at which the moving object has reached the unable-to-continue state to the restoration point selected by the player decreases. For example, when first to Nth (N is an integer equal to or larger than 2) restoration points are set as the restoration point, and the jth restoration point among the first to Nth restoration points is situated close to the unable-to-continue point as compared with the ith (1<i<j<N) restoration point among the first to Nth restoration points, the player is charged at a high rate when the player has selected the jth restoration point that is situated close to the unable-to-continue point as compared with the case where the player has selected the ith restoration point that is situated away from the unable-to-continue point.

The restoration processing section 607 may calculate a predicted moving point of the moving object when assuming that the moving object has not reached the unable-to-continue state. The charging section 608 may perform the charging process that increases the charge when the player has selected the predicted moving point as the restoration point as compared with the case where the player has selected another point as the restoration point. For example, a time lag period occurs until the restoration process is started after the moving object has reached the unable-to-continue state. The restoration processing section 607 calculates the predicted moving point that is predicted to have been reached during the time lag period when the moving object has not reached the unable-to-continue state. For example, the restoration processing section 607 calculates the predicted moving point by performing a movement simulation process on the moving object based on the movement information (e.g., speed and acceleration) about the moving object at the unable-to-continue point. The charging section 608 performs the charging process that increases the charge (amount or points charged) when the player has selected the predicted moving point as the restoration point as compared with the case where the player has selected another point as the restoration point.

In one embodiment of the invention, when the distance from the unable-to-continue point at which the moving object has reached the unable-to-continue state to the restoration point selected by the player is long, the charging section 608 performs the charging process that decreases the charge, and the restoration processing section 607 performs a process that sets a game condition when the moving object is restored to be an advantageous condition. When the distance from the unable-to-continue point to the restoration point is short, the charging section 608 performs the charging process that increases the charge, and the restoration processing section 607 performs a process that sets the game condition when the moving object is restored to be a disadvantageous condition. According to the above configuration, when the player has selected the restoration point that is situated away from the unable-to-continue point, the player is charged at a low rate, and the game condition when the moving object is restored is set to be an advantageous condition. When the player has selected the restoration point that is situated close to the unable-to-continue point, the player is charged at a high rate, and the game condition when the moving object is restored is set to be a disadvantageous condition. Examples of the game condition include a game parameter setting condition when the moving object is restored, a condition relating to the wait time until the moving object is set to the restorable state from the unable-to-continue state, a condition relating to the maximum restoration count of the moving object, a condition relating to the effect of the moving object on the game parameter of another moving object when the moving object is restored, an equipment change condition when the moving object is restored, and the like. The advantageous game condition refers to a condition whereby the player can advantageously proceed with the game when the moving object is restored, or after the moving object has been restored. The disadvantageous game condition refers to a condition whereby the player cannot advantageously proceed with the game when the moving object is restored, or after the moving object has been restored.

The restoration processing section 607 performs a process that presents (displays) a plurality of candidate restoration points to the player, the plurality of candidate restoration points being set along the moving path of the moving object up to the unable-to-continue point at which the moving object has reached the unable-to-continue state. Alternatively, the restoration processing section 607 performs a process that presents (displays) a plurality of candidate restoration points to the player, the plurality of candidate restoration points being set to a plurality of distance ranges that differ in distance from the unable-to-continue point.

For example, information about the moving path of the moving object up to the timing at which the moving object has reached the unable-to-continue state is stored. A plurality of restoration points are set along the moving path, and displayed to the player using the display section 290 of the terminal device, for example. Alternatively, a plurality of distance ranges are set with respect to the unable-to-continue point, and displayed to the player using the display section 290 of the terminal device, for example. Note that the moving path need not necessarily perfectly coincide with the restoration points. For example, the restoration points may be set using only the X and Y coordinates (coordinates in the planar direction) of each point of the moving path without using the Z coordinate (coordinate in the height direction) of each point of the moving path. The distance range may be a range in the shape of a concentric circle (approximate concentric circle) formed around the unable-to-continue point, for example. Note that the distance range is not limited thereto. For example, it suffices that the restoration point set to the kth distance range among first to Mth distance ranges be situated close to the unable-to-continue point as compared with the restoration point set to the lth (1<k<l<M) distance range among the first to Mth distance ranges.

The restoration processing section 607 may perform a process that changes the game condition when the moving object is restored corresponding to the charge. Specifically, the game condition is set to be an advantageous condition when the charging section 608 has determined to charge the player at a high rate, and set to be a disadvantageous condition when the charging section 608 has determined to charge the player at a low rate. More specifically, the restoration processing section 607 change at least one game condition among the game parameter setting condition when the moving object is restored, the condition relating to the wait time until the moving object is set to the restorable state from the unable-to-continue state, the condition relating to the maximum restoration count of the moving object, the condition relating to the effect of the moving object on the game parameter of another moving object when the moving object is restored, and the equipment change condition when the moving object is restored, corresponding to the charge. For example, the game condition is set to be an advantageous condition when the player is charged at a high rate (amount or points charged), and set to be a disadvantageous condition when the player is charged at a low rate.

The game parameter setting condition refers to a setting condition for various parameters of the moving object or the like used for the game process. Examples of the parameters include a recovery capability, durability, an attack capability, moving performance (speed or acceleration), stability, an enemy search capability, and the like. The condition relating to the wait time until the moving object is set to the restorable state from the unable-to-continue state refers to a condition relating to a wait time for the player, a time lag, or the like that occurs until the moving object is set to the restorable state from the unable-to-continue state, for example. The condition relating to the maximum restoration count of the moving object refers to a condition relating to the upper limit of the number of times that the moving object can be restored during the game, for example. The condition relating to the effect of the moving object on the game parameter of another moving object when the moving object is restored refers to a condition relating to the effect (e.g., damage) of the moving object on the enemy moving object or the like when the moving object is restored, for example. The equipment change condition when the moving object is restored refers to a condition relating to whether or not to allow a change in equipment when the moving object is restored, for example.

In one embodiment of the invention, even when the charging section 608 does not perform the charging process that causes the charge to differ corresponding to the restoration point, the restoration processing section 607 may perform the process that changes the game condition when the moving object is restored corresponding to the restoration point selected by the player.

Although an example in which the server system 500 illustrated in FIG. 2 performs the game process, the restoration process, the charging process, and the like has been described above, the configuration is not limited thereto. For example, the terminal device illustrated in FIG. 3 may perform part (some) or the entirety (all) of the game process, the restoration process, the charging process, and the like. In this case, a restoration processing section, a charging section, a restoration point information storage section, a charging information storage section, and the like may be provided in the terminal device illustrated in FIG. 3, and the terminal device (or a system in which the terminal device cooperates with the server system) functions as the game system according to one embodiment of the invention.

2. Method

The method according to one embodiment of the invention is described in detail below. Although an example in which the game system according to one embodiment of the invention is applied to a fighter aircraft game is mainly described below, the game system according to one embodiment of the invention is not limited thereto. For example, the game system according to one embodiment of the invention may be applied to various games such as a role-playing game (RPG), an action game, a strategy simulation game, a breeding game, a card game, a driving game, or a sport game. In such a case, the moving object is an object (e.g., character, ship, car, train, animal, or robot) that appears in the games, and moves in the game space.

2.1 Charging Process Corresponding to Restoration Point

The game system according to one embodiment of the invention is configured so that the server system and the terminal device (player terminal) are connected through the network, and the player can enjoy playing a network game with another player. For example, the network game is a free-to-play (F2P) game that can be started free of charge. The charging process is performed corresponding to an added value (e.g., item, play time, experience value, points, or customization) given to the player.

FIG. 4 is a view illustrating a team battle mode (i.e., game mode) that is implemented by the network game. In the team battle mode, players PL1 to PL4 who play the online game in real time select the desired fighter aircraft/weapon, and form a team consisting of up to four fighter aircraft MB1 to MB4 (moving objects in a broad sense). Players PL5 to PL8 who compete with the players PL1 to PL4 also form a team consisting of up to four fighter aircraft MB5 to MB8, and make a sortie as a rival unit that belongs to the same camp as the players PL1 to PL4, and competes with the players PL1 to PL4 for military results.

The game is designed so that the teams arbitrarily attack non-player characters (NPC) that belong to the enemy force and are disposed in positions A1 to A3 on a map within a given time limit, and one of the teams with a higher total score wins the game. It is desirable that each fighter aircraft make an appropriate attack (e.g., an attack aircraft mainly makes a ground attack, and a fighter aircraft mainly engages in an aerial battle) in order to win the game. The team battle mode allows the player to play the game as desired in cooperation with other members, and determine his skill while caring for other members. Since the rival team also engages in a battle aimed to achieve a high score, the player can enjoy plotting various strategies (e.g., scoring high points by defeating a high-ranking enemy NPC prior to the rival team, or scoring high points by defeating a large number of enemy NPC while the rival team has difficulty with defeating a high-ranking NPC).

When the time limit has elapsed, and the game has ended, the score of each member of each team is added up to calculate the total score of each team, and a team with a higher score is determined to have win the game. Each player who belongs to the winning team can enjoy a feeling of accomplishment that his team has defeated the rival team, and each player who belongs to the losing team can also enjoy a feeling of accomplishment since he is evaluated as a pilot who contributed to the battle.

Since such a network game is designed so that a team that has conquered a large number of enemy positions within the time limit, and achieved a higher total score wins the game, the time limit is an important element. Specifically, it is necessary to avoid a time loss as much as possible in order to accomplish a mission. Therefore, it is considered that the player is highly concerned about a time loss that occurs when his fighter aircraft has been shot down, and made a sortie again through the restoration process in order to win the game.

Figures 5A, 5B:
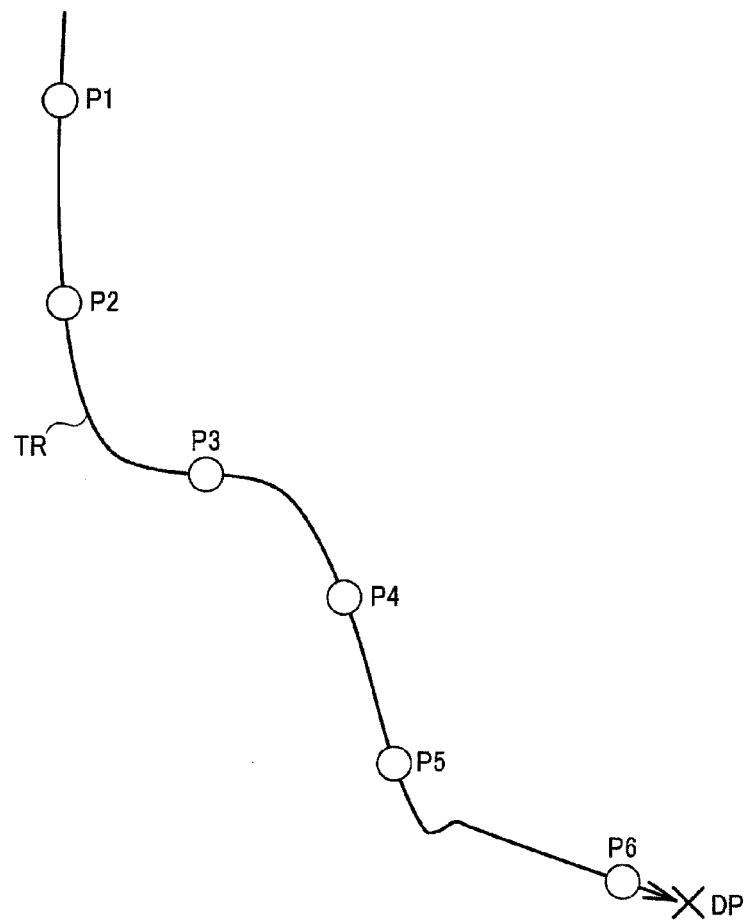
FIGS. 5A and 5B are views illustrating a method according to one embodiment of the invention.

In one embodiment of the invention, a plurality of candidate restoration points P1 to P6 are set along a trajectory TR of the fighter aircraft (moving object) from the start point to a dead point DP (unable-to-continue point in a broad sense) at which the fighter aircraft has been shot down (see FIG. 5A). When the fighter aircraft operated by the player has been shot down (has reached the unable-to-continue state in a broad sense), the fighter aircraft is restored at a restoration point selected by the player from the candidate restoration points P1 to P6. In one embodiment of the invention, the charging process is performed that causes the charge to differ corresponding to the restoration point selected by the player. Note that the trajectory TR (path or track) need not necessarily perfectly coincide with the moving path of the fighter aircraft (moving object). For example, the Z coordinate (height direction) may be set to an arbitrary value, and only the X and Y coordinates (planar direction) may be caused to coincide with those of the moving path of the fighter aircraft. Alternatively, a point that is situated around the trajectory TR and is appropriate as the restoration point may be determined using a given algorithm, and may be set to be the restoration point.

FIG. 5B illustrates an example of the charging information (charging table) in which the charge is linked to each restoration point.

The charging information illustrated in FIG. 5B makes it possible to implement a charging process that increases the charge as the distance from the dead point DP (unable-to-continue point) of the fighter aircraft to the restoration point selected by the player decreases. For example, when the player has selected the restoration point P1 that is furthest from the dead point DP, the charge (amount or points charged) is 0 (i.e., minimum charge). When the player has selected the restoration point P6 that is closest to the dead point DP, the charge is 500 (i.e., maximum charge). Note that the restoration point P6 may be set at the same position as the dead point DP.

According to the above configuration, the player can restore the fighter aircraft at a point near the dead point DP in exchange for being charged at a high rate. Therefore, even when the fighter aircraft operated by the player has been shot down, and the player has been delayed by other players in the network game illustrated in FIG. 4, the player can make up for lost time by quickly causing the fighter aircraft to make a sortie again in exchange for being charged at a high rate. Specifically, the player can compensate for a time loss that has occurred after the fighter aircraft has been shot down in exchange for being charged, and can return to the front as early as possible. If the player can return to the front as early as possible, the team and the player can achieve better military results, and the player will be highly satisfied with the game or the game results.

The restoration point may be set/selected, and the charging information may be presented using various methods. For example, an animation as illustrated in FIGS. 6A to 6D may be displayed after the fighter aircraft operated by the player has been shot down.

In FIGS. 6A to 6D, a fighter aircraft MB moves along the trajectory TR from the start point to the dead point with the lapse of time. The animation illustrated in FIGS. 6A to 6D may be implemented using a simple map that represents the game space in a reduced/simplified manner, for example.

Figure 6A:
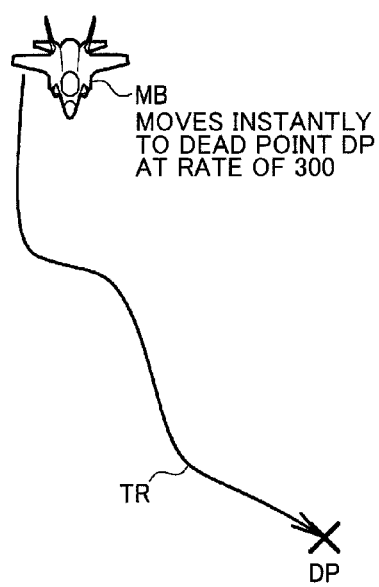
FIGS. 6A to 6D are views illustrating an animation display method during a charging process.
Figure 6B:
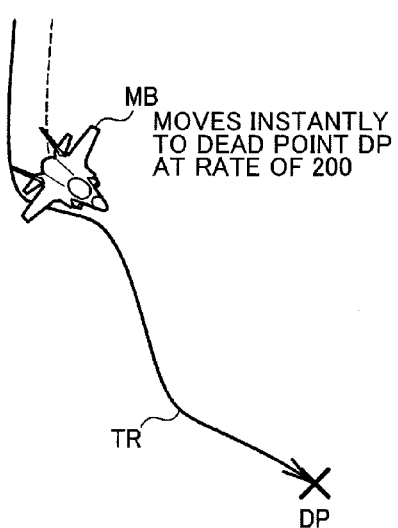
Figure 6C:
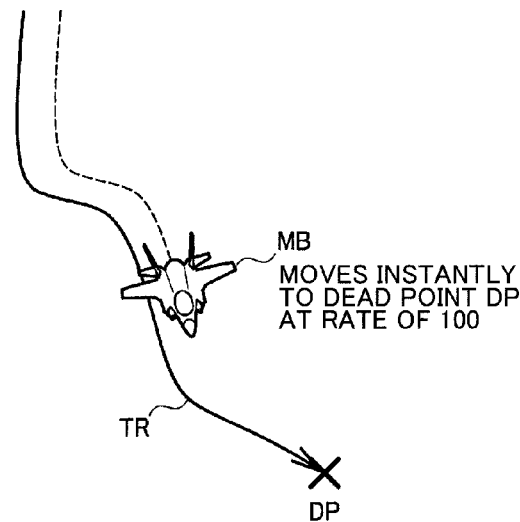
Figure 6D:
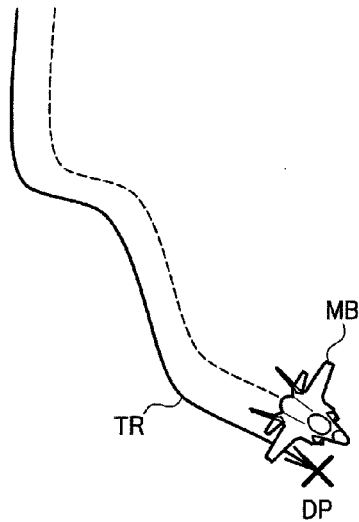

When the player has selected to restore the fighter aircraft MB at the timing illustrated in FIG. 6A, the player is charged at a rate of 300, and the fighter aircraft MB is restored at the restoration point illustrated in FIG. 6A, and moves instantly to the dead point DP. When the player has selected to restore the fighter aircraft MB at the timing illustrated in FIG. 6B (i.e., when 5 seconds has elapsed from the timing illustrated in FIG. 6A), the player is charged at a rate of 200, and the fighter aircraft MB is restored at the restoration point illustrated in FIG. 6B, and moves instantly to the dead point DP. When the player has selected to restore the fighter aircraft MB at the timing illustrated in FIG. 6C (i.e., when 10 seconds has elapsed from the timing illustrated in FIG. 6A), the player is charged at a rate of 100, and the fighter aircraft MB is restored at the restoration point illustrated in FIG. 6C, and moves instantly to the dead point DP. When the player has selected to restore the fighter aircraft MB at the timing illustrated in FIG. 6D (i.e., when 15 seconds has elapsed from the timing illustrated in FIG. 6A), the player is not charged, and the fighter aircraft MB is restored at the dead point DP.

For example, a player who desires to restore the fighter aircraft as early as possible selects to restore the fighter aircraft at the timing illustrated in FIG. 6A, and the fighter aircraft immediately makes a sortie again from the dead point DP. The player is charged at a high rate in compensation therefor. A player who does not desire to restore the fighter aircraft as early as possible waits for a certain time to elapse, and selects to restore the fighter aircraft at the timing illustrated in FIG. 6D, for example, and the fighter aircraft makes a sortie again from the dead point DP. The above method makes it unnecessary for the player to perform a restoration point selection input, and makes it possible to provide a player-friendly interface environment.

The method illustrated in FIGS. 6A to 6D allows the player to indirectly select the restoration point that changes in position with the passage of time instead of directly selecting the restoration point. Specifically, the restoration point need not necessarily be selected directly (explicitly) by the player, but may be selected indirectly by the player as illustrated in FIGS. 6A to 6D.

The restoration point need not necessarily be set along the actual trajectory of the moving object. For example, the restoration point may be set at a predicted moving point.

Figure 7A:
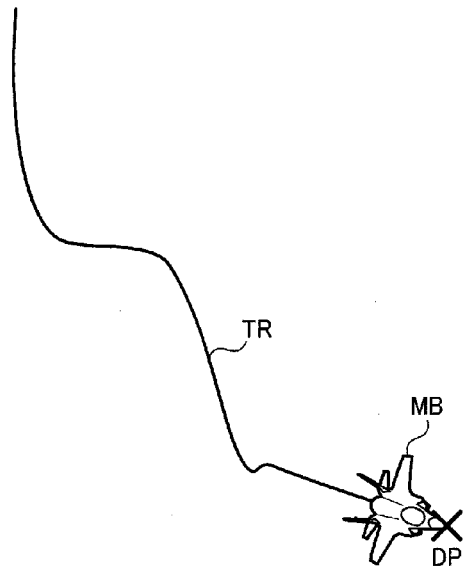
FIGS. 7A and 7B are views illustrating a method that moves a moving object to a predicted moving point.
Figure 7B:
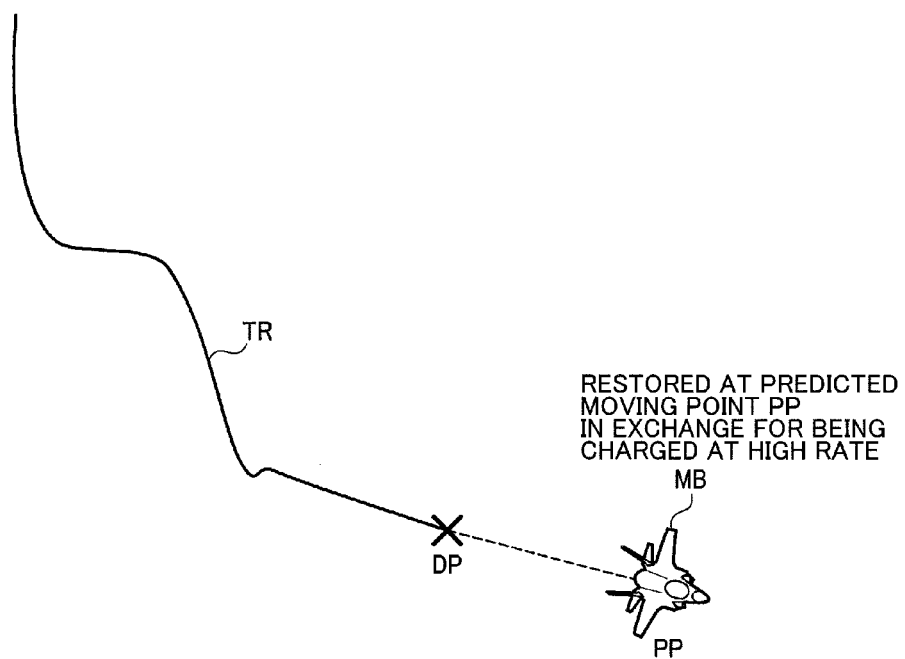

In FIG. 7A, the fighter aircraft MB has been shot down at the dead point DP (i.e., unable-to-continue state). In this case, a predicted moving point PP is calculated, the predicted moving point PP being a point that is predicted to have been reached when assuming that the fighter aircraft MB has not been shot down. For example, the predicted moving point PP of the fighter aircraft MB is calculated based on movement information (e.g., speed, acceleration, and moving direction) about the fighter aircraft MB when the fighter aircraft MB has been shot down (see FIG. 7A), and a time lag period until the fighter aircraft MB is restored after being shot down. When the player has selected the predicted moving point PP as the restoration point in exchange for being charged at a high rate, the fighter aircraft MB can make a sortie again. Specifically, when the player has selected the predicted moving point PP as the restoration point, the player is charged at a high rate as compared with the case where the player has selected another point (e.g., P1 to P6 in FIG. 5A) as the restoration point.

According to the above configuration, the player can cause the fighter aircraft MB to make a sortie from the predicted moving point PP that is predicted to have been reached when the fighter aircraft MB has not been shot down. Therefore, the player can compensate for the time lag period until the fighter aircraft MB is restored after being shot down in exchange for being charged. This makes it possible for the player to further reduce the time loss that has occurred after the fighter aircraft MB has been shot down.

Figure 8A:
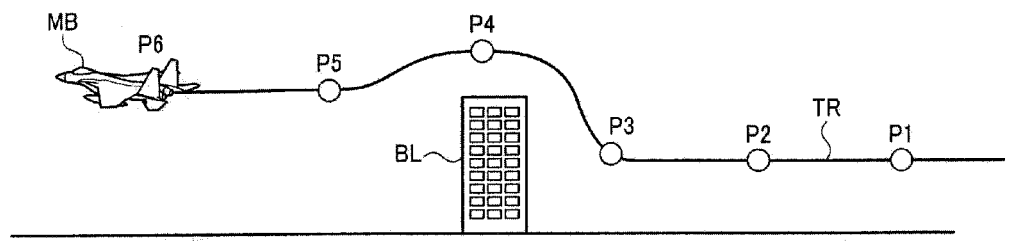
FIGS. 8A and 8B are views illustrating a problem that may occur when setting a restoration point.

In FIG. 8A, the fighter aircraft MB draws a trajectory TR that avoids a building BL (i.e., obstacle). In this case, if the player selects the point P3 along the trajectory TR as the restoration point, the fighter aircraft MB that has been restored, and has made a sortie again may collide with the building BL that is situated in front of the fighter aircraft MB, for example.

In order to prevent the above problem, the restoration point may be set to a plurality of distance ranges that differ in distance from the unable-to-continue point.

Figure 8B:
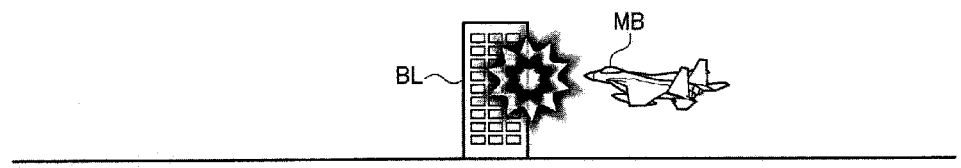
Figure 9A:
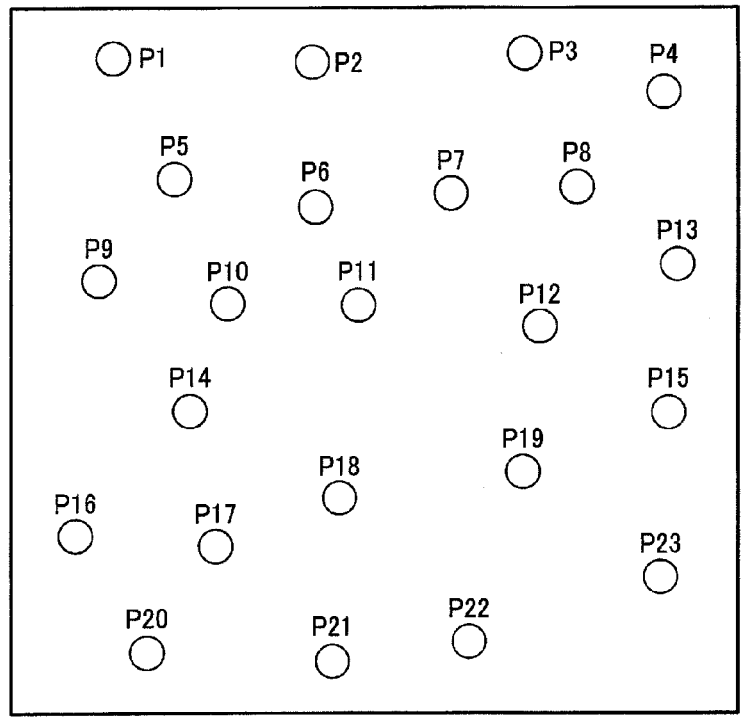
FIGS. 9A and 9B are views illustrating a restoration point setting method using a distance range.

In FIG. 9A, a plurality of restoration points P1 to P23 are set on a map in advance. Specifically, the restoration points P1 to P23 are set irrespective of the trajectory of the fighter aircraft. It is possible to prevent occurrence of the problem as illustrated in FIGS. 8A and 8B by thus setting the restoration points P1 to P23 on a map in advance. Specifically, it is possible to prevent occurrence of the above problem by setting the restoration points P1 to P23 at positions around which an obstacle such as the building BL is not present.

Figure 9B:
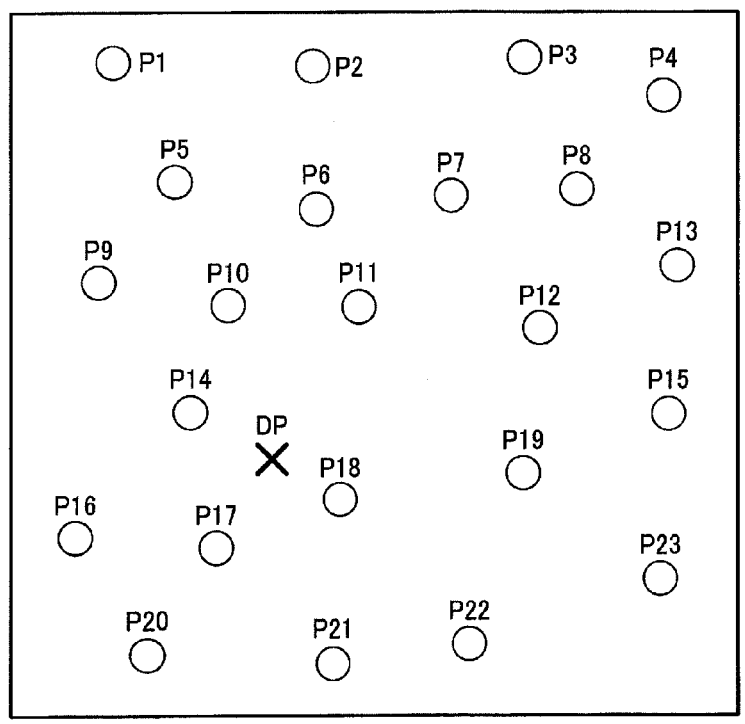

When the fighter aircraft has been shot down at the dead point DP illustrated in FIG. 9B, a plurality of distance ranges RG1, RG2, and RG3 (see FIG. 10A) are set with respect to the dead point DP. In FIG. 10A, the distance ranges RG1, RG2, and RG3 are set to be concentric circles formed around the dead point DP. The player selects the desired restoration point from the restoration points P1 to P23 set within the distance ranges RG1, RG2, and RG3. The fighter aircraft is restored at the selected restoration point, and makes a sortie.

In this case, when the player has selected the restoration point P14, P17, or P18 within the distance range RG1 that is set to be relatively close to the dead point DP, the player is charged at a high rate. When the player has selected the restoration point P1, P2, P3, P4, P8, P13, P15, or P23 within the distance range RG3 that is set to be situated relatively away from the dead point DP, the player is charged at a low rate. When the player has selected the restoration point P5, P6, P7, P9, P10, P11, P12, P16, P19, P20, P21, or P22, the player is charged at an intermediate rate.

Note that the player may select only the distance range RG1, RG2, or RG3, and a computer may automatically select the restoration point within the distance range RG1, RG2, or RG3 according to a given algorithm. In this case, the charge may be determined corresponding to the distance range RG1, RG2, or RG3 selected by the player.

The shape and the configuration of the distance range may be modified in various ways. For example, the distance range may have a fan shape (see FIG. 10B) or the like. For example, when the front or the enemy position to which the player desires to return is situated in the upper right direction in FIG. 10A, it is advantageous for the player to select the distance range RG3 for which the player is charged at a low rate.

It is possible to prevent such a situation by setting the distance ranges RG1, RG2, and RG3 to have the shape illustrated in FIG. 10B taking account of the position of the front or the enemy position. For example, when the front or the enemy position is situated in the lower left direction indicate by B1 in FIG. 10B, fan-shaped distance ranges RG1, RG2, and RG3 are provided as illustrated in FIG. 10B. In this case, the distance range RG3 (that is situated in the upper right direction) is situated away from the front or the enemy position situated in the lower left direction (see B1) as compared with the distance range RG1. Therefore, it is possible to prevent the above situation by allowing the player to select the restoration point P1, P2, or P3 within the distance range RG1 for which the player is charged at a high rate, or select the restoration point P8, P9, P10, P11, or P12 within the distance range RG3 for which the player is charged at a low rate.

FIG. 11A illustrates an example of the restoration point information stored in the restoration point information storage section 672 (see FIG. 2). In FIG. 11A, information about the position of the restoration point, and information about the direction of the fighter aircraft when the fighter aircraft is restored, are linked to each restoration point (P1, P2, P3, . . . ). It is possible to prevent occurrence of the problem as illustrated in FIGS. 8A and 8B by appropriately setting the position of the restoration point and the direction of the fighter aircraft when the fighter aircraft is restored. For example, when the direction of the fighter aircraft MB is set to be opposite to the building BL in FIG. 8B, it is possible to prevent a situation in which the fighter aircraft MB collides with the building BL immediately after restoration.

FIG. 11B illustrates an example of a charging information table stored in the charging information storage section 674 (see FIG. 2) when the restoration point is set using the distance range. In FIG. 11B, the amount or points charged when the restoration point within each distance range has been selected is linked to each distance range. The charging process using the distance range can be simplified by employing such a charging information table, for example.

FIG. 12 is a view illustrating a method that performs the charging process corresponding to the fighter aircraft rank. For example, rank is set to the fighter aircraft used by the player. The fighter aircraft of rank A has high performance (battle performance and travel performance), the fighter aircraft of rank B has low performance, and fighter aircraft of rank C has intermediate performance. As illustrated in FIG. 12, the fighter aircraft (moving object) of high rank (performance) can be restored (can make a sortie again) at only a far restoration point, and the fighter aircraft of low rank can be restored at a near restoration point.

For example, when the charge is 0, the fighter aircraft of rank A can be restored at only a restoration point within the distance range RG3, and cannot be restored at a restoration point within the distance range RG1 or RG2. The fighter aircraft of rank B can be restored at a restoration point within the distance range RG2 or RG3, and cannot be restored at a restoration point within the distance range RG1. The fighter aircraft of rank C can be restored at a restoration point within the distance range RG1, RG2, or RG3.

When the charge is 100, the fighter aircraft of rank A can be restored at a restoration point within the distance range RG2 or RG3, and the fighter aircraft of rank B can be restored at a restoration point within the distance range RG1, RG2, or RG3. The fighter aircraft of rank C can be restored at a restoration point within the distance range RG1, RG2, or RG3 regardless of the charge.

When the charge is 200, the fighter aircraft of rank A can be restored at a restoration point within the distance range RG1, RG2, or RG3. The fighter aircraft of rank B can be restored at a restoration point within the distance range RG1, RG2, or RG3 when the charge is 100 or 200.

When the restoration distance range is caused to differ corresponding to the rank (performance) of the fighter aircraft as described above, it is possible to set a disadvantageous game condition when the fighter aircraft of high rank is restored, and set an advantageous game condition when the fighter aircraft of low rank is restored. Therefore, the game balance and the like can be improved.

2.2 Setting of Game Condition when Fighter Aircraft (Moving Object) is Restored

In one embodiment of the invention, the game condition when the fighter aircraft (moving object) is restored is set as illustrated in FIG. 12. The game condition when the fighter aircraft (moving object) is restored may be set using various methods.

Figure 13A:
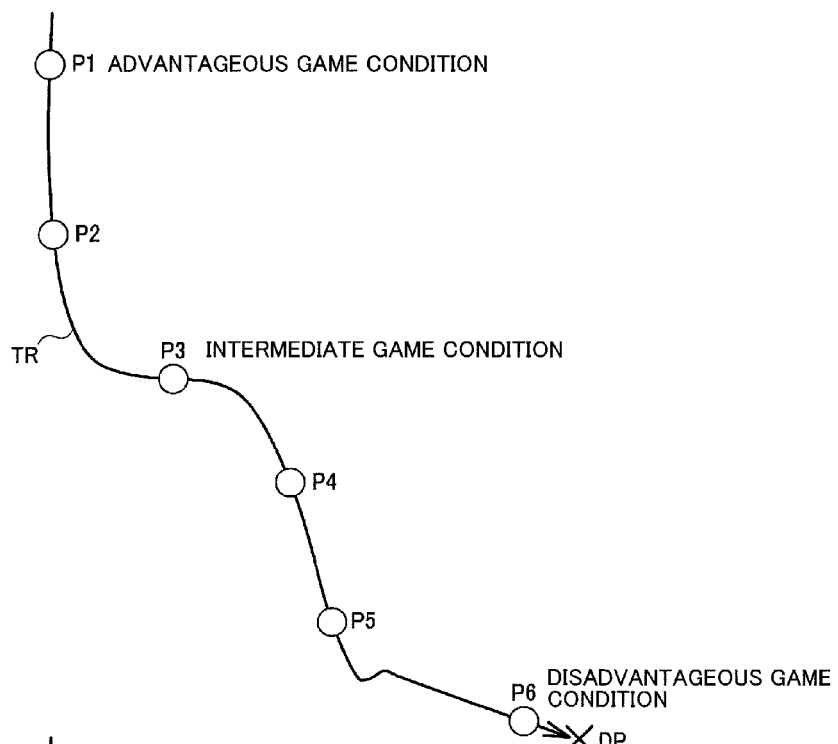
FIGS. 13A and 13B are views illustrating a method that sets a game condition corresponding to a restoration point.

In FIG. 13A, the game condition when the fighter aircraft (moving object) is restored is caused to differ corresponding to the restoration point selected by the player, for example. Specifically, when the fighter aircraft is restored at the restoration point P1 that is situated away from the dead point DP, the game condition is set to be an advantageous condition. When the fighter aircraft is restored at the restoration point P6 that is situated close to the dead point DP, the game condition is set to be a disadvantageous condition. When the fighter aircraft is restored at the intermediate restoration point P3, the game condition is set to be intermediate between the advantageous condition and the disadvantageous condition. For example, the game condition is set so that the recovery rate of the game parameter (e.g., durability, fuel (energy), missile, or special weapon) when the fighter aircraft is restored increases as the distance from the dead point DP increases.

According to the above configuration, even when the fighter aircraft has been restored at the restoration point P1 that is situated away from the dead point DP, and delayed in reaching the front or the enemy position due to a time loss, the disadvantageous situation due to the time loss is compensated since the game condition (e.g., the recovery rate of the game parameter) is set to be an advantageous condition. Even when the fighter aircraft has been restored at the restoration point P6 that is situated close to the dead point DP, and quickly reached the front or the enemy position without a time loss, it is possible to prevent a situation in which the fighter aircraft that has been restored at the restoration point P6 is put at an excessive advantage since the game condition (e.g., the recovery rate of the game parameter (replenishment parameter)) is set to be a disadvantageous condition.

Figure 13B:
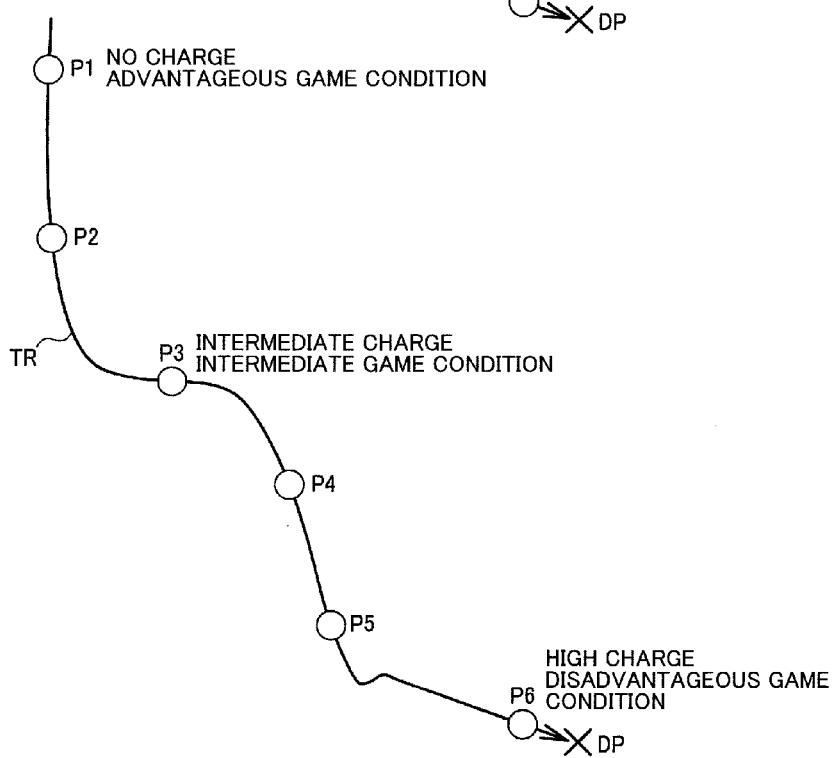

FIG. 13B illustrates an example in which the charging method described above with reference to FIGS. 5A and 5B is combined with the game condition setting method described above with reference to FIG. 13A.

In FIG. 13B, when the fighter aircraft is restored at the restoration point P1 that is situated away from the dead point DP, the player is charged at a low rate, and the game condition is set to be an advantageous condition. For example, when the player has selected the restoration point P1 that is situated away from the dead point DP, the charge is set to 0, and the recovery rate of the game parameter is set to 100% (or the recovery curve is set to be a rapidly ascending curve), for example.

When the distance from the dead point DP to the restoration point is short, the player is charged at a high rate, and the game condition is set to be a disadvantageous condition. For example, when the player has selected the restoration point P6 that is situated close to the dead point DP, the player is charged at a high rate, and the recovery rate of the game parameter is set to 10% (i.e., the recovery curve is set to be a gradually ascending curve), for example.

The above configuration makes it possible to maintain the balance between the advantage setting that utilizes the charge and the advantage setting that utilizes the game condition, and improve the game balance.

In one embodiment of the invention, the game condition when the moving object is restored may be changed corresponding to the charge (amount charged). For example, the game condition when the moving object is restored is set to be an advantageous condition when the player is charged at a high rate (i.e., when the charge is high). Examples of the game condition include the game parameter setting condition when the moving object is restored, the condition relating to the wait time until the moving object is set to the restorable state from the unable-to-continue state, the condition relating to the maximum restoration count of the moving object, the condition relating to the effect of the moving object on the game parameter of another moving object when the moving object is restored, the equipment change condition when the moving object is restored, and the like.

In FIG. 14, the game parameter setting condition when the fighter aircraft (moving object) is restored is changed corresponding to the charge. As illustrated in FIG. 14, the game parameter setting condition is not changed when the charge is 0. When the charge is 100, the speed (i.e., game parameter) of the fighter aircraft is increased for 30 seconds after restoration. When the charge is 200, the speed of the fighter aircraft is increased for 30 seconds after restoration, and the weapon (e.g., missile) reload speed of the fighter aircraft is increased for 60 seconds after restoration. The reload speed is one of the game parameters of the fighter aircraft. When the charge is 500, the speed of the fighter aircraft is increased, and the fighter aircraft becomes invincible for 30 seconds after restoration. The weapon reload speed of the fighter aircraft is also increased for 60 seconds after restoration. Moreover, the damage applied by the enemy is reduced by 50% for 90 seconds after restoration. The damage is one of the game parameters of the fighter aircraft.

In FIG. 15A, the game parameter setting condition when the fighter aircraft is restored is similarly changed corresponding to the charge. Specifically, the recovery rate of the game parameter (e.g., durability, fuel, or amount of weapon (number of bullets)) of the fighter aircraft upon restoration is low when the charge is 0. When the charge is 100, the recovery rate upon restoration increases. When the charge is 200, the game parameter (e.g., durability, fuel, or amount of weapon) of the fighter aircraft is recovered to 100% immediately after restoration. When the charge is 500, the game parameter (e.g., durability, fuel, or amount of weapon) of the fighter aircraft is increased to 120% immediately after restoration.

In FIG. 15B, the condition relating to the wait time until the fighter aircraft is set to the restorable state after the fighter aircraft has been shot down (i.e., after the fighter aircraft has reached the unable-to-continue state) are changed corresponding to the charge. Specifically, when the charge is 0, the wait time (time lag period) until the fighter aircraft is set to the restorable state is set to be long. When the charge is 200, the countdown speed of the wait time is increased so that the wait time until the fighter aircraft is set to the restorable state decreases. When the charge is 500, the wait time until the fighter aircraft is set to the restorable state is set to 0. Therefore, the player can reduce the time loss until the fighter aircraft returns to the front or the enemy position.

In FIG. 15C, the condition relating to the maximum restoration count of the moving object is changed corresponding to the charge. Specifically, when the charge is 0, the maximum restoration count (maximum sortie count) is set to 3 (default). When the charge is 200, the maximum restoration count is set to 4. When the charge is 400, the maximum restoration count is set to 8. When the maximum restoration count increases, the moving object can make a sortie again an increased number of times even when the moving object has been shot down. Note that the moving object may be allowed to make a sortie again to exceed the maximum restoration count when the charge is 0, and a penalty may be imposed on the player when the maximum restoration count has been exceeded. The moving object may be allowed to make a sortie again without imposing a penalty on the player when the player has accepted to be charged.

In FIG. 16A, the condition relating to the effect of the moving object operated by the player on the game parameter (e.g., durability) of another moving object when the moving object is restored is changed corresponding to the charge. When the charge is 0, the fighter aircraft operated by the player makes no additional action. When the charge is 100, the fighter aircraft operated by the player can make a sortie again after applying damage (effect) to the enemy that was aiming at the fighter aircraft operated by the player when the fighter aircraft operated by the player was shot down. When the charge is 200, the fighter aircraft operated by the player can make a sortie again after defeating the enemy that was aiming at the fighter aircraft operated by the player when the fighter aircraft operated by the player was shot down. When the charge is 500, the fighter aircraft operated by the player can make a sortie again after applying damage to all of the enemies on the map. The moving object operated by the player exerts an effect on the game parameter of another moving object when the moving object is restored by applying damage to the enemy or defeating the enemy as described above. Note that the moving object operated by the player may exerts an effect on (e.g., apply damage to) the enemy that is situated at a specific distance from the dead point or the restoration point (sortie point) upon restoration.

In FIG. 16B, the equipment change condition when the moving object is restored is changed corresponding to the charge. Specifically, when the player does not accept to be charged, the player is not allowed to change weapon, skill, or the like after restoration. When the player has accepted to be charged, the player is allowed to change weapon, skill, or the like after restoration. For example, the enemy that appears when the game has started may differ in characteristics from the enemy that appears in the middle stage or the final stage of the game, and it may be difficult for the player to advantageously proceed with the game using the equipment provided when the game has started. In this case, it is possible to deal with the enemy having different characteristics that appears in the middle stage or the final stage of the game by accepting to be charged, and changing the equipment (e.g., weapon or skill).

Although an example in which the game condition when the moving object is restored is changed corresponding to the charge has been mainly described above, the game condition when the moving object is restored may be changed corresponding to the restoration point selected by the player. In this case, the game condition described above with reference to FIGS. 14 to 16B may be used as the game condition. Specifically, the game condition such as the game parameter setting condition when the moving object is restored, the condition relating to the wait time until the moving object is set to the restorable state from the unable-to-continue state, the condition relating to the maximum restoration count of the moving object, the condition relating to the effect of the moving object on the game parameter of another moving object when the moving object is restored, or the equipment change condition when the moving object is restored, is changed corresponding to the restoration point selected by the player. For example, the game condition is set to be a disadvantageous condition when the restoration point selected by the player is situated close to the dead point, and set to be an advantageous condition when the restoration point selected by the player is situated away from the dead point. The above configuration makes it possible to improve the game balance and the like.

3. Detailed Processing Example

A detailed processing example according to one embodiment of the invention is described below with reference to FIGS. 17 to 20 (flowcharts).

Figure 17:
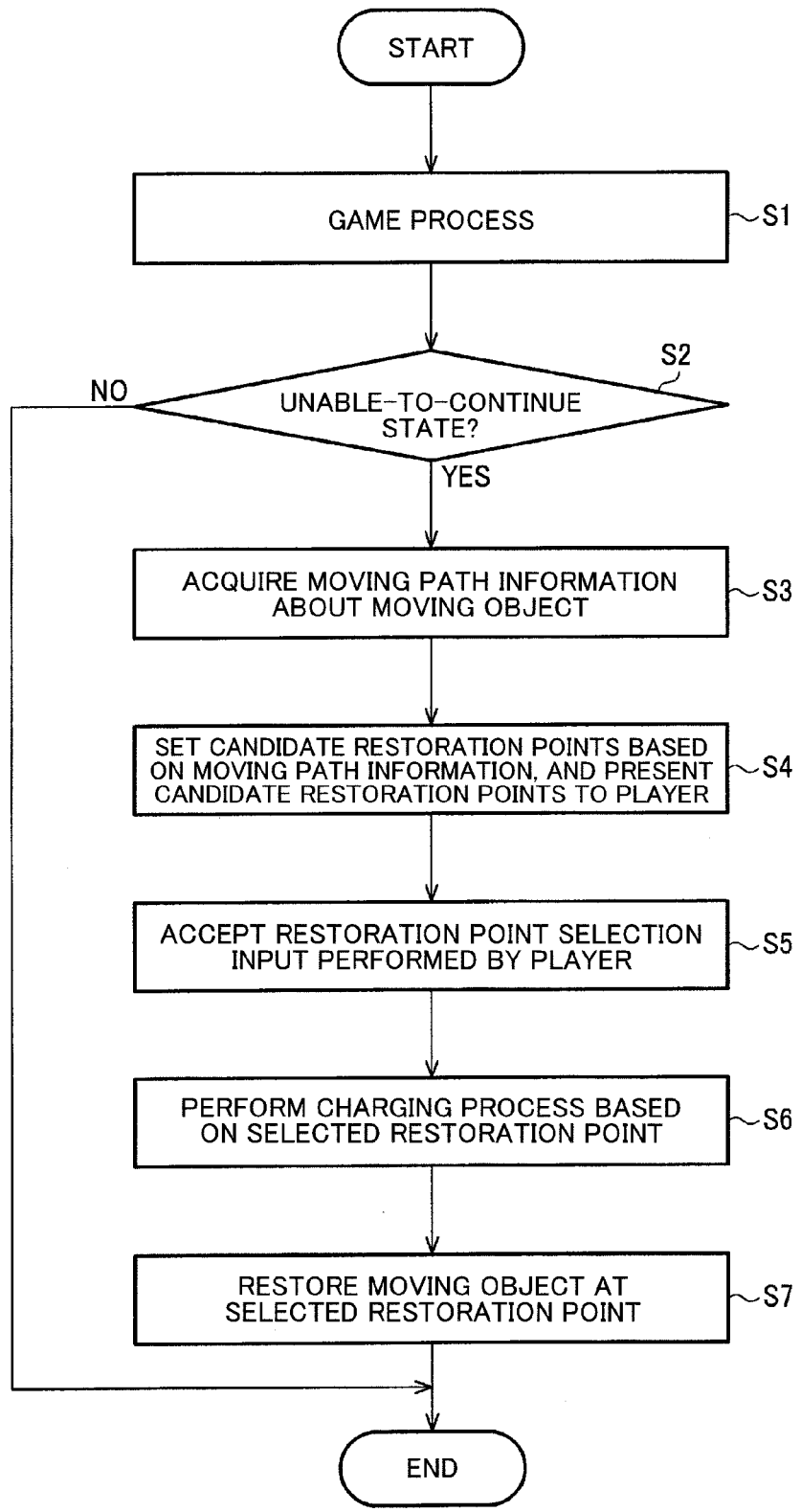
FIG. 17 is a flowchart illustrating a detailed processing example according to one embodiment of the invention.

FIG. 17 is a flowchart illustrating a detailed processing example of the method according to one embodiment of the invention described above with reference to FIGS. 5A and 5B and the like.

The game process (e.g., the process that proceeds with the game, the movement process, and the battle process) using the moving object is performed, and whether or not the moving object has reached the unable-to-continue state (e.g., has been shot down) is determined (steps S1 and S2). When it has been determined that the moving object has reached the unable-to-continue state, moving path information about the moving object is acquired (step S3). For example, the moving path information (position and direction) about the moving object is temporarily stored in a buffer for a given period, and the moving path information is read from the buffer when it has been determined that the moving object has reached the unable-to-continue state.

The candidate restoration points are set along the moving path as described with reference to FIG. 5A based on the acquired moving path information, and presented to the player (step S4). For example, a restoration point selection screen is displayed on the display section 290 of the terminal device. A restoration point selection input performed by the player is accepted (step S5). For example, a restoration point selection input performed using the restoration point selection screen is accepted.

The charging process is performed based on the selected restoration point (step S6). For example, the amount or points charged is determined using the charging information table illustrated in FIG. 5B. The restoration process that restores the moving object at the selected restoration point is then performed (step S7). Specifically, the moving object is disposed at the position in the game space that corresponds to the restoration point, and the moving object is caused to make a sortie when the operation information has been input by the player.

Figure 18:
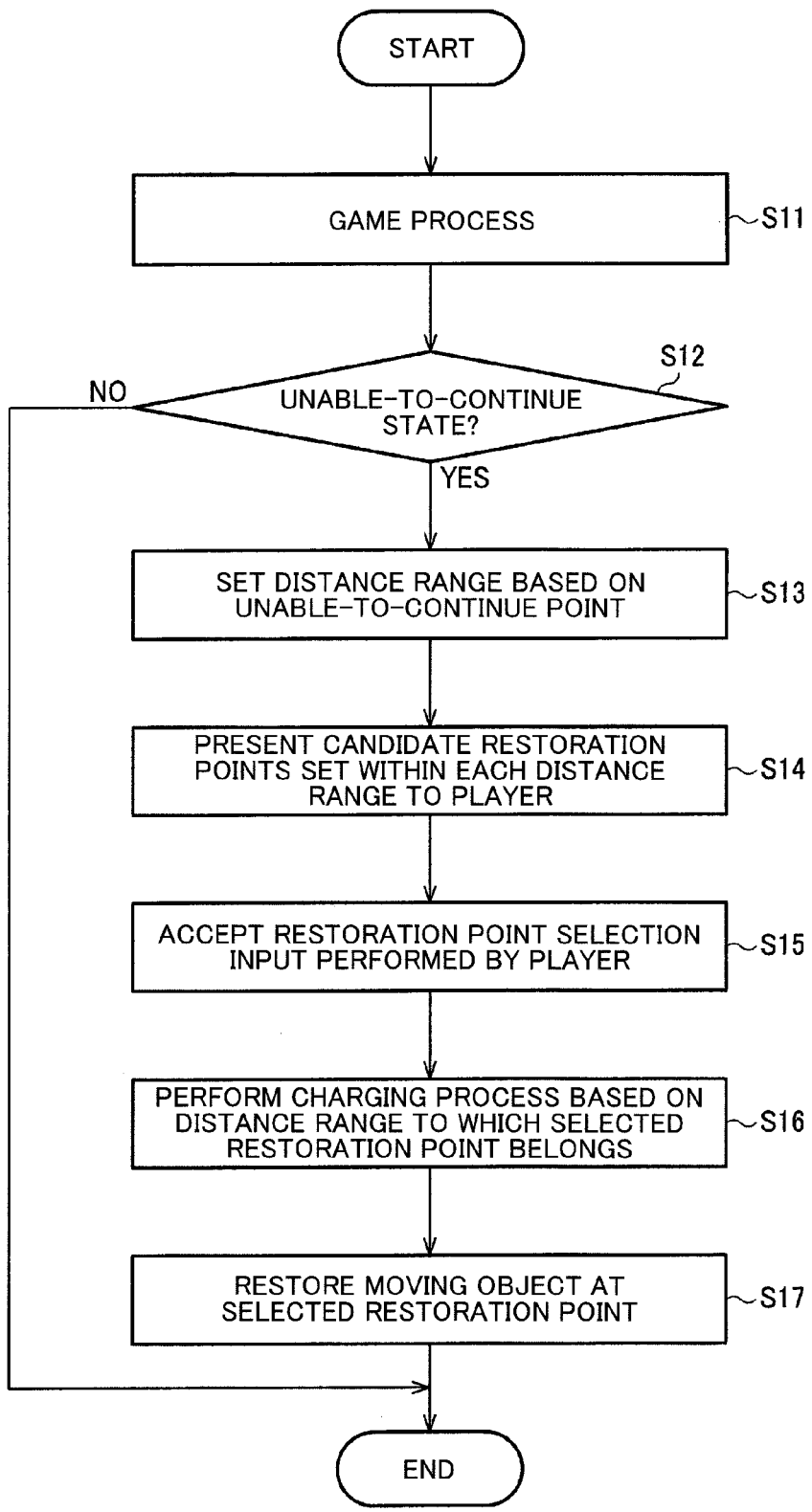
FIG. 18 is a flowchart illustrating a detailed processing example according to one embodiment of the invention.

FIG. 18 is a flowchart illustrating a detailed processing example of the method according to one embodiment of the invention described above with reference to FIGS. 9A to 11B and the like.

The game process using the moving object is performed, and whether or not the moving object has reached the unable-to-continue state is determined (steps S11 and S12). When it has been determined that the moving object has reached the unable-to-continue state, the distance range is set based on the unable-to-continue point (dead point) as described above with reference to FIGS. 10A and 10B (step S13). For example, a plurality of distance ranges are set that differ in distance from the unable-to-continue point.

The candidate restoration points set within each distance range are presented to the player (step S14). For example, a restoration point (distance range) selection screen is displayed on the display section 290 of the terminal device. A restoration point selection input performed by the player is accepted (step S15).

The charging process is performed based on the distance range to which the selected restoration point belongs (step S16). For example, the amount or points charged is determined using the charging information table illustrated in FIG. 11B. The restoration process that restores the moving object at the selected restoration point is then performed (step S17).

Figure 19:
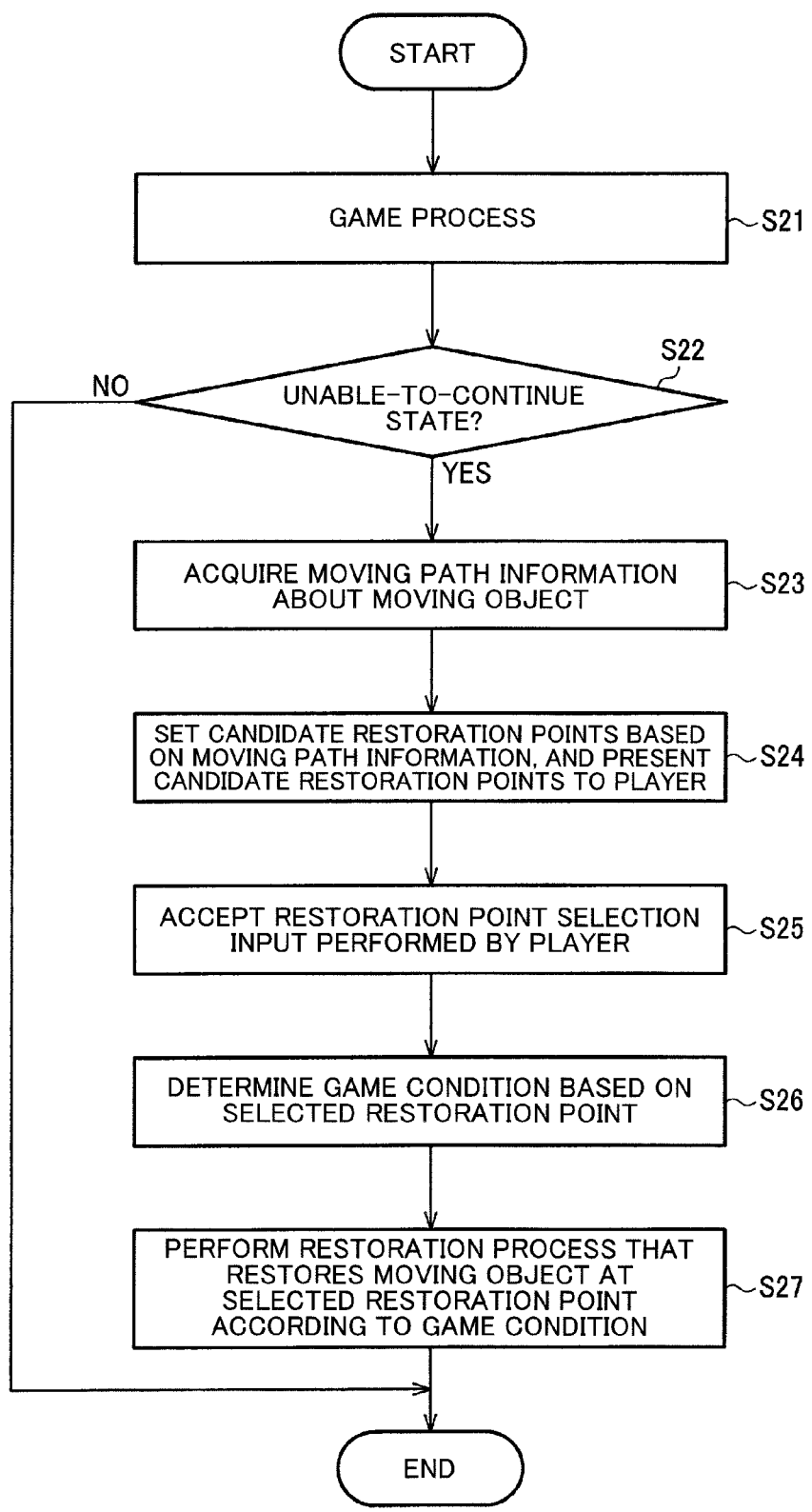
FIG. 19 is a flowchart illustrating a detailed processing example according to one embodiment of the invention.

FIG. 19 is a flowchart illustrating a detailed processing example of the method according to one embodiment of the invention described above with reference to FIGS. 13A and 13B and the like. Specifically, FIG. 19 is a flowchart illustrating the method that changes the game condition when the moving object is restored corresponding to the restoration point.

Steps S21 to S25 in FIG. 19 are the same as the steps S1 to S5 in FIG. 17, and description thereof is omitted. After accepting the restoration point selection input performed by the player in the step S25, the game condition when the moving object is restored is set based on the selected restoration point (step S26 in FIG. 19). The game condition described above with reference to FIGS. 14 to 16B may be used as the game condition, for example.

When the game condition has been set, the restoration process that restores the moving object at the selected restoration point according to the game condition is performed (step S27). For example, when using the game condition illustrated in FIG. 15A, the recovery speed of the durability or the like of the moving object is increased, or the recovery value of the moving object is increased when the selected restoration point is situated away from the unable-to-continue point. When using the game condition illustrated in FIG. 15B, the wait time until the moving object is set to the restorable state is reduced when the selected restoration point is situated away from the unable-to-continue point. The above process makes it possible to set the game condition when the moving object is restored to be an advantageous condition or a disadvantageous condition corresponding to the restoration point selected by the player.

Figure 20:
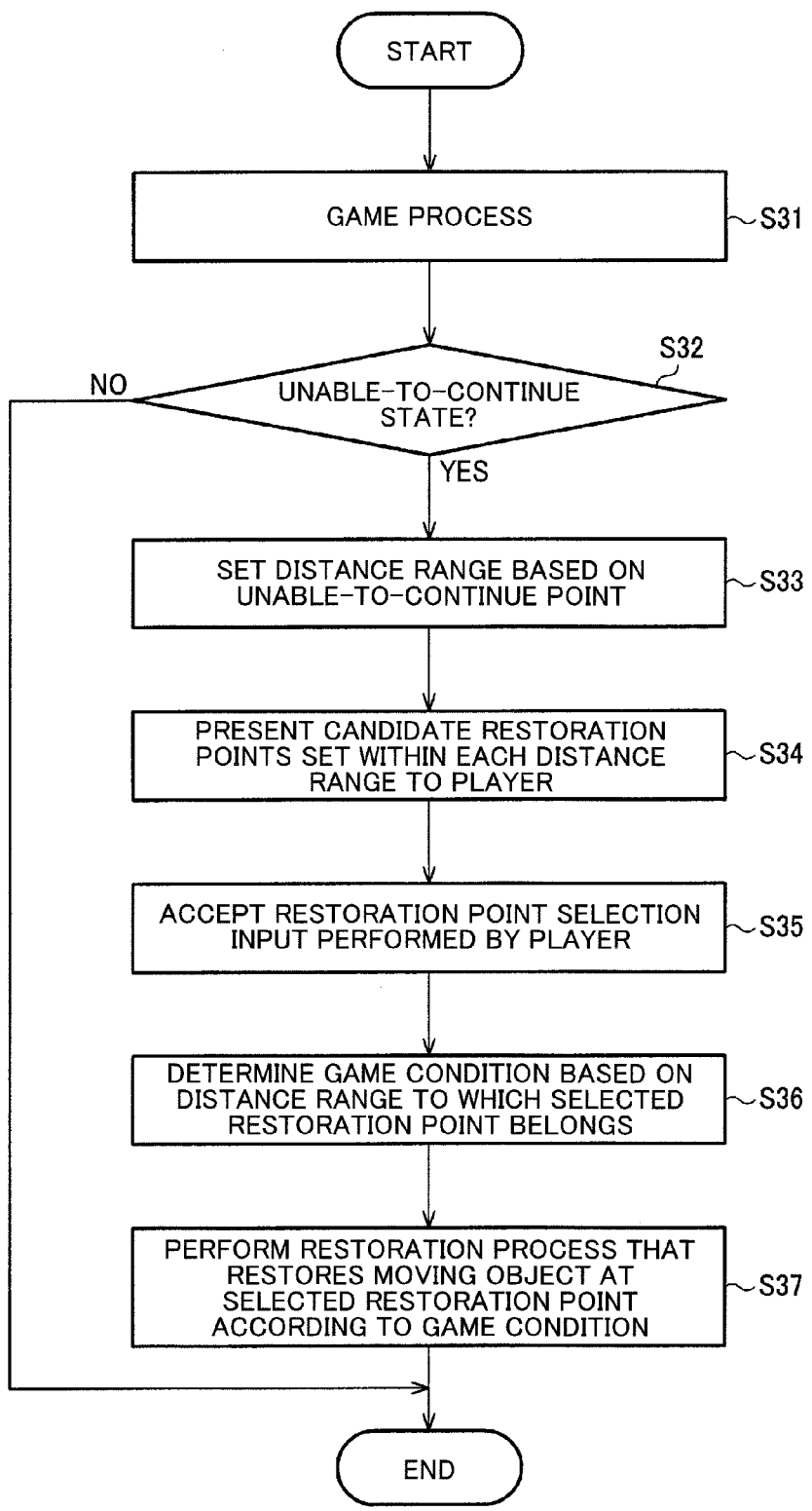
FIG. 20 is a flowchart illustrating a detailed processing example according to one embodiment of the invention.

FIG. 20 is a flowchart illustrating a detailed processing example of the method that changes the game condition when the moving object is restored corresponding to the restoration point when the distance range is set as illustrated in FIGS. 9A to 10B.

Steps S31 to S35 in FIG. 20 are the same as the steps S11 to S15 in FIG. 18, and description thereof is omitted. After accepting the restoration point selection input performed by the player in the step S35, the game condition when the moving object is restored is set based on the distance range to which the selected restoration point belongs (step S36 in FIG. 20). When the game condition has been set, the restoration process that restores the moving object at the selected restoration point according to the game condition is performed (step S37).

Although FIGS. 19 and 20 illustrate a detailed processing example of the method that changes the game condition when the moving object is restored corresponding to the restoration point, the method that changes the game condition when the moving object is restored corresponding to the charge may be similarly implemented. In this case, the game condition when the moving object is restored may be set corresponding to the charge in the step S26 in FIG. 19 or the step S36 of FIG. 20.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term (e.g., fighter aircraft or dead point) cited with a different term (e.g., moving object or unable-to-continue state) having a broader meaning or the same meaning at least once in the specification and the drawings can be replaced by the different term in any place in the specification and the drawings. The moving object restoration process, the restoration point setting process, the charging process, the game condition setting process, the game process, and the like are not limited to those described in connection with the above embodiments. Methods equivalent to the above methods are also included within the scope of the invention.

What is claimed is:

1. A game system comprising:
    a game processing section that performs a process that implements a game that utilizes a moving object, the moving object moving in a game space based on operation information;
    a restoration processing section that performs a restoration process that restores the moving object that has reached an unable-to-continue state when it has become unable to continue to play the game that utilizes the moving object, the moving object being restored at a restoration point in the game space that has been selected by a player; and
    a charging section that performs a charging process,
    the charging section performing the charging process that causes a charge to differ corresponding to the restoration point selected by the player.

2. The game system as defined in claim 1,
    the charging section performing the charging process that increases the charge as a distance from an unable-to-continue point to the restoration point selected by the player decreases, the unable-to-continue point being a point at which the moving object has reached the unable-to-continue state.

3. The game system as defined in claim 1,
    the restoration processing section calculating a predicted moving point of the moving object when assuming that the moving object has not reached the unable-to-continue state, and
    the charging section performing the charging process that increases the charge when the player has selected the predicted moving point as the restoration point as compared with a case where the player has selected another point as the restoration point.

4. The game system as defined in claim 1,
    the charging section performing the charging process that decreases the charge, and the restoration processing section performing a process that sets a game condition when the moving object is restored to be an advantageous condition, when a distance from an unable-to-continue point to the restoration point selected by the player is long, the unable-to-continue point being a point at which the moving object has reached the unable-to-continue state, and
    the charging section performing the charging process that increases the charge, and the restoration processing section performing a process that sets the game condition when the moving object is restored to be a disadvantageous condition, when the distance from the unable-to-continue point to the restoration point is short.

5. The game system as defined in claim 1,
    the restoration processing section performing a process that presents a plurality of candidate restoration points to the player, the plurality of candidate restoration points being set along a moving path of the moving object up to an unable-to-continue point at which the moving object has reached the unable-to-continue state, or set to a plurality of distance ranges that differ in distance from the unable-to-continue point.

6. The game system as defined in claim 1,
    the restoration processing section performing a process that changes at least one game condition corresponding to the charge determined by the charging process, the at least one game condition being at least one condition among a game parameter setting condition when the moving object is restored, a condition relating to a wait time until the moving object is set to a restorable state from the unable-to-continue state, a condition relating to a maximum restoration count of the moving object, a condition relating to an effect of the moving object on a game parameter of another moving object when the moving object is restored, and an equipment change condition when the moving object is restored.

7. A server system comprising:
    a game processing section that performs a process that implements a game that utilizes a moving object, the moving object moving in a game space based on operation information;

a restoration processing section that performs a restoration process that restores the moving object that has reached an unable-to-continue state when it has become unable to continue to play the game that utilizes the moving object, the moving object being restored at a restoration point in the game space that has been selected by a player; and a charging section that performs a charging process, the charging section performing the charging process that causes a charge to differ corresponding to the restoration point that has been selected by the player.

8. A processing method comprising:

performing a process that implements a game that utilizes a moving object, the moving object moving in a game space based on operation information;

performing a restoration process that restores the moving object that has reached an unable-to-continue state when it has become unable to continue to play the game that utilizes the moving object, the moving object being restored at a restoration point in the game space that has been selected by a player; and performing a charging process that causes a charge to differ corresponding to the restoration point selected by the player.

9. A computer-readable information storage medium storing a program that causes a computer to execute the processing method as defined in claim 8.

* * * * *